(12) United States Patent
Yidi

(10) Patent No.: US 10,808,338 B1
(45) Date of Patent: Oct. 20, 2020

(54) WOVEN PERSONAL RESPIRATOR MASK AND METHODS OF MAKING SAME

(71) Applicant: Finotex U.S.A. Corp., Miami, FL (US)

(72) Inventor: Carlos Yidi, Miami, FL (US)

(73) Assignee: Finotex U.S.A. Corp., Miami, FL (US)

( * ) Notice: Subject to any disclaimer, the term of this patent is extended or adjusted under 35 U.S.C. 154(b) by 0 days.

(21) Appl. No.: 16/845,227

(22) Filed: Apr. 10, 2020

(51) Int. Cl.
| | | |
|---|---|---|
| A41D 13/11 | (2006.01) | |
| D03D 1/00 | (2006.01) | |
| B01D 39/08 | (2006.01) | |
| D03D 13/00 | (2006.01) | |
| D06H 7/22 | (2006.01) | |
| D06N 3/00 | (2006.01) | |
| A62B 18/02 | (2006.01) | |
| A41D 13/05 | (2006.01) | |
| D03D 35/00 | (2006.01) | |

(52) U.S. Cl.
CPC ......... D03D 1/0035 (2013.01); A41D 13/11 (2013.01); A62B 18/025 (2013.01); B01D 39/083 (2013.01); D03D 13/004 (2013.01); D06H 7/221 (2013.01); D06N 3/0006 (2013.01); B01D 2239/0613 (2013.01); B01D 2239/10 (2013.01); D03D 35/00 (2013.01); D03D 2700/0174 (2013.01); D06N 2201/02 (2013.01); D06N 2209/1671 (2013.01); D10B 2331/04 (2013.01); D10B 2401/13 (2013.01)

(58) Field of Classification Search
CPC ............................ A41D 13/11; A41D 13/1161; A41D 13/1176; A61M 16/06
See application file for complete search history.

(56) References Cited

U.S. PATENT DOCUMENTS

| | | | | |
|---|---|---|---|---|
| 3,101,709 | A * | 8/1963 | Gruenewaelder | A41D 13/1192 128/206.12 |
| 3,322,119 | A * | 5/1967 | Szucs | A61F 13/0206 602/44 |
| 3,699,958 | A * | 10/1972 | Szucs | A61L 15/46 604/304 |
| 5,740,798 | A * | 4/1998 | McKinney | A41D 13/1161 128/206.14 |
| 6,427,693 | B1 * | 8/2002 | Blackstock | A41D 13/11 128/205.27 |
| 7,086,401 | B2 * | 8/2006 | Chiam | A41D 13/11 128/206.16 |
| 10,058,099 | B2 * | 8/2018 | Whitten | A01N 25/34 |
| 10,357,626 | B1 * | 7/2019 | Baker | A61M 16/0057 |

(Continued)

*Primary Examiner* — Robert H Muromoto, Jr.
(74) *Attorney, Agent, or Firm* — Gregory L. Maybeck; Dickinson Wright PLLC

(57) ABSTRACT

A method for producing a woven personal respirator mask includes providing a plurality of warp ends into an electronic woven label loom, programming the loom to weave the warp ends into a sheet having a repeating mask pattern in the weave direction, the mask pattern comprising an edge border having a tight weave and defining therein a filter section, the filter section having a tubular weave to define an outer layer and an inner layer, at least one of the outer layer and an inner layers comprising a filter weave, and at least one intermediate interlock fastening at least a point of the outer layer to an opposing point on the inner layer, and cutting the sheet to separate the repeating mask pattern into individual mask parts with a hot-wire slitter.

20 Claims, 15 Drawing Sheets

(56) References Cited

U.S. PATENT DOCUMENTS

| | | | |
|---|---|---|---|
| 2002/0177828 A1* | 11/2002 | Batich | A61F 13/8405 |
| | | | 604/367 |
| 2005/0054779 A1* | 3/2005 | Zhou | B32B 37/12 |
| | | | 525/240 |
| 2006/0143940 A1* | 7/2006 | Yidi, Jr. | F26B 13/10 |
| | | | 34/444 |
| 2009/0113681 A1* | 5/2009 | Yidi, Jr. | D03D 35/00 |
| | | | 28/143 |
| 2014/0220845 A1* | 8/2014 | Elder | D02G 3/441 |
| | | | 442/198 |
| 2019/0290874 A1* | 9/2019 | Baker | A61M 16/0057 |
| 2019/0355491 A1* | 11/2019 | Tolle | D03D 47/25 |

* cited by examiner

WOVEN PERSONAL RESPIRATOR MASK AND METHODS OF MAKING SAME

STATEMENT REGARDING FEDERALLY SPONSORED RESEARCH OR DEVELOPMENT

Not Applicable

FIELD OF THE INVENTION

The present systems, apparatuses, and methods lie in the field of air respiration filtering. The present disclosure relates to a woven personal respirator mask and methods of producing same.

BACKGROUND OF THE INVENTION

The advent of the COVID-19 virus has resulted in an extreme scarcity of masks to cover the eyes and nose. While the CDC recommends practices for extended use and limited reuse of NIOSH-certified N95 filtering facepiece respirators (commonly called "N95 respirators") by medical professionals, the general public no longer has access to masks having significant protection against exhaled airborne particles. Further, such masks are manufactured by factories following standardized guidelines so that the certification can be attested to by the manufacturer. The general public, therefore, is left with fashioning their own masks, which may be insufficient for the desired level of protection.

Thus, a need exists to overcome the problems with the prior art systems, designs, and processes as discussed above.

SUMMARY OF THE INVENTION

The systems, apparatuses, and methods described provide a woven personal respirator mask and methods of producing same that overcome the hereinafore-mentioned disadvantages of the heretofore-known devices and methods of this general type and that provide such features with easy and inexpensive manufacture and with the ability to wash or sterilize the mask for repeated use.

The Jacquard weaving machine was named after its inventor, Joseph Marie Jacquard in 1801. The mechanical action of that machine was controlled by punch cards having punched holes representing the warp up and warps down of every individual warp yarn. Multiple rows of designing holes corresponding to required pattern are punched on each card. These mechanical Jacquards were often small and were able to control independently only a few warp ends. Therefore, it needed many repeats across the width of the loom with which the Jacquard weaving machine is used. Subsequently, larger capacity looms were created that allowed comparatively greater control and needed fewer repeats. Multiple Jacquard machines were also used to reduce the required number of repeats. In this way, it got possible to weave larger designs across the loom width.

A Jacquard weaving machine is a device fitted to a power-weaving loom (e.g., a Rapier loom or an Air-jet loom) that simplifies the process of manufacturing textiles allowing complex weaving patterns. The Jacquard refers to an added control mechanism that automates patterning within the weaving. Electronic Jacquard machine capacity has increased to now have a single end warp control extend to all warp ends (e.g., more than 10,000 depending on the width of the loom and density/cm) using electronic magnetic cards, which allows repeats and symmetrical designs and allows for almost infinite versatility. Electronic Jacquard machines are costly; the larger machines allowing single end warp control being on the order of tens of thousands of dollars.

One exemplary embodiment of a weaving loom is an electronic woven label loom. An electronic woven label loom is defined herein as a Rapier or Air-jet loom with an electronic Jacquard weaving machine and a downstream hot-wire slitter.

Jacquard fabrics are complex patterned fabrics having floats and luster. They are more stable and stretchy and more complex compared to fabrics made through basic weaves. Atlas fabrics, satin fabrics, brocade fabrics, three-dimensional fabrics, and damask fabrics are some of the examples of Jacquard fabric.

It has been determined that the Jacquard weaving machine can produce any particular set of weave patterns that can be cut into a specially woven personal respirator mask exceeding N95 requirements. The mask is of a woven fabric having a tubular weaved filter section with intermediate interlocking picks to hold the outer and inner layers with respect to one another and, in doing so, create a respirator filter. In an exemplary embodiment the weave of the respirator filter warp is between approximately 50 threads/cm and approximately 250 threads/cm. In a further exemplary embodiment, the weave is between approximately 120 threads/cm and approximately 210 threads/cm. The mask pattern has an exterior mask frame that is woven tightly for strength. The mask pattern has an internal central portion where the two layers are separated due a tubular weave construction. This separated section has tie-down picks of between approximately 45 picks/cm and approximately 120 picks/cm (e.g., approximately 48 picks/cm to 75 picks/cm or approximately 80 picks/cm) to balloon or pillow the two layers, e.g., as in a quilt. Significantly, the weave pattern picks can form a watermark in any shape, for example, it can be a series of letters to form a name or trademark and/or it can be a design to form a trademark logo. With the picks, the two fabric layers are prevented from moving with respect to one another and create a better filtration. At the opposing lateral ends of the exterior mask frame, the mask pattern contains a tubular weave longitudinal channel through which an elastic is easily provided. The material of the Jacquard weaving can take any form and, importantly, it is a material that can be re-used repeatedly, by either placing the mask in hot water or even being placed in an autoclave or other sterilizing processes. With reuse, the user needs to have only one or two masks and never has to throw away any mask. With such protection, elimination of viruses, including COVID-19, becomes possible with use of quarantine and social distancing practices.

Significantly, the mask pattern is repeated horizontally in a standard Jacquard weaving machine to create at least 5 and up to 8 or 12 for each repeating pattern of the mask. As the mask pattern is substantially rectangular, the mask pattern is repeated less for each horizontal series than for a longitudinal mask pattern series depending on the Jacquard capacity.

The weave can be of 100% polyester fiber and can be antimicrobial. Medical yarns can be used and chemicals can be added to resist blood, for example, ECOPERL ACTIVE produced by CHT, with the process of a Foulard machine.

The loom can have one warp beam or more, for example, up to 3 warp beams. And, in combination with creel, it is possible to feed different tensions in certain warp yarns to be able to make future shapes in the mask and multiple compartments to substantially increase the quality of the filtration. With additional warp beams, the quality of the filtration can be increased. The mask pattern can have a third layer to have a third filter layer coming from the same loom using an additional warp beam (this third layer can be, e.g., yarn) or to create more complex patterns as three-dimensional textiles.

The weaving pattern of the mask can also leave out some warp threads to open up the intermediate pillow section into a pocket, into which a secondary filter material can be placed. Examples of this secondary filter material include, nonwoven filtration fabrics (such as needlefelts produced from staple fibers, wetlaid produced from short-cut fibers, spunbond, meltblown fabrics, tea bag paper, face cloths, shingling and synthetic fiber paper, composite, carded/carding, needle punch, thermal bonded, chemical bonded, nanotechnology), activated carbon filter material.

It is possible to create another pocket at the top center of the mask that allow use of a separate firm frame piece (for example, a piece of aluminum) giving the user an ability to bend the frame piece to customize a shape of a portion of the mask, for example, at the nose portion upper edge to allow the user to bend the frame piece around the user's nose.

After the sheet of mask pattern sets is woven, the individual masks are cut, for example, by at least one or a plurality of slitters located at the loom downstream of the weaving. In one exemplary embodiment, of an electronic woven label loom, downstream hot-wire cutters are positioned between each adjacent mask in the horizontal repeating pattern. In this configuration, immediately after being woven, a single column of masks is cut into N strip sheets, N being one greater than the number of cutters. An exemplary embodiment of the cutters includes a thermal cutter described in International Patent Publication WO 2009/061310 to Yidi. The strip sheets can be cut immediately with cross-cutters to form individual masks or they can be rolled into strip rolls for later cutting of the individual masks. The strip sheets can be cut, for example, with hot knife, cold knife, laser, or air-jet cutters. In an alternative embodiment, the entire woven fabric sheet can be rolled into a single roll for later cutting. An exemplary embodiment of a cutter that can cut the entire woven sheet with its multiple rows and columns is a Gerber laser cutter, such as a Gerber MCT Cutter found at https://www.gerbertechnology.com/packaging/laser-cutting/gerber-mct-cutter/.

As an alternative to weaving the vertical pocket for insertion of elastic, the pocket can be eliminated and a laser cutter, such as the Gerber laser cutter, can cut four (or more) holes, one at each the corner of the mask, for threading in an elastic ear loop therethrough.

With the foregoing and other objects in view, there is provided, a method for producing a woven personal respirator mask comprises the steps of providing a plurality of warp ends into a weaving loom, programming the loom to weave the warp ends into a sheet having a repeating mask pattern in the weave direction, cutting the sheet to separate the repeating mask pattern into individual mask parts, and securing an elastic ear cord through each of left and right woven tubes to create a pair of ear-securing loops for each mask part and form a woven personal respirator mask. The mask pattern comprises an upper edge, a lower edge, a left lateral side having a tight weave, a right lateral side having the tight weave, an upper side having the tight weave, a lower side having the tight weave, a left woven tube extending parallel to the warp ends from the upper edge to the lower edge, having a tubular weave, and comprising an upper end at the upper edge between the left lateral side and a left end of the upper side and a lower end at the lower edge between the left lateral side and a left end of the lower side, a right woven tube extending parallel to the warp ends from the upper edge to the lower edge, having a tubular weave, and comprising an upper end at the upper edge between the right lateral side and a right end of the upper side and a lower end at the lower edge between the right lateral side and a right end of the lower side, a filter section having a tubular weave to define an outer layer and an inner layer and defined by an upper edge of the lower side, a lower edge of the upper side, a right edge of the left woven tube, and the left edge of the right woven tube, at least one of the outer layer and an inner layers comprising a filter weave, and at least one intermediate interlock fastening at least a point of the outer layer to an opposing point on the inner layer.

With the objects in view, there is also provided a method for producing a woven personal respirator mask comprises the steps of providing a plurality of warp ends into an electronic woven label loom, programming the loom to weave the warp ends into a sheet having a repeating mask pattern in the weave direction, the mask pattern comprising an edge border having a tight weave and defining therein a filter section, the filter section having a tubular weave to define an outer layer and an inner layer, at least one of the outer layer and an inner layers comprising a filter weave, and at least one intermediate interlock fastening at least a point of the outer layer to an opposing point on the inner layer, and cutting the sheet to separate the repeating mask pattern into individual mask parts with a hot-wire slitter.

In accordance with another mode, the weaving loom is an electronic woven label loom and the step of cutting is carried out by cutting the repeating mask pattern into individual mask parts with hot-wire slitters.

In accordance with a further mode, the weave of the lateral sides, the upper and lower sides, and the woven tube is one of between approximately 55 threads/cm and approximately 250 threads/cm and between approximately 130 threads/cm and approximately 220 threads/cm.

In accordance with an added mode, the weave of the filter section is one of between approximately 50 threads/cm and approximately 250 threads/cm and between approximately 120 threads/cm and approximately 210 threads/cm.

In accordance with an additional mode, the interlocks are a plurality of picks having one of between approximately 45 picks/cm and approximately 120 picks/cm to pillow the outer and inner layers and between approximately 48 picks/cm and approximately 75 picks/cm to pillow the outer and inner layers.

In accordance with yet another mode, the interlocks form watermarks in the shape of at least one of a series of letters, a name, a trademark, and logo.

In accordance with yet a further mode, there is provided the step of preventing the inner and outer layers from moving with respect to one by adding a plurality of the interlocks.

In accordance with yet an added mode, there is provided the step of forming the weave and the warp ends of a material selected from at least one of 100% polyester fiber, a polyester fiber blend, a 100% polyester filament with a level of twist up to 2000 turns per meter.

In accordance with yet an additional mode, the material is reusable, autoclavable, and sterilizable.

In accordance with again another mode, there is provided the step of coating the mask pattern with at least one of an antimicrobial and a blood-resistant chemical.

In accordance with again a further mode, there is provided the step of weaving the warp ends with between one and three warp beams.

In accordance with again an added mode, there is provided the step of weaving the mask pattern to leave out at least one warp end to form the filter section into a pocket.

In accordance with again an additional mode, there is provided the step of placing a secondary filter material into the pocket of the filter section, the secondary filter material comprises at least one of nonwoven filtration fabrics, needlefelts produced from staple fibers, wetlaid produced from short-cut fibers, spunbond, meltblown fabrics, tea bag paper, face cloths, shingling and synthetic fiber paper, composite, carded/carding, needle punch, thermal bonded, chemical bonded, nanotechnology, and activated carbon filter material.

In accordance with still another mode, there is provided the steps of weaving the mask pattern to create a pocket at a top center of the mask pattern and providing a moldable frame piece into the pocket to permit customization of a shape of a nose portion of the mask.

In accordance with still a further mode, there is provided the step of carrying out the cutting step by cutting the mask patterns with at least one of a hot knife slitter, a cold knife cutter, a laser cutter, and an air-jet cutter.

In accordance with still an added mode, there is provided the step of weaving the mask pattern to create a cutter guide weave at the four extreme edges of each mask pattern.

In accordance with still an additional mode, there is provided the step of, before the step of cutting, rolling the sheet onto a dowel and, after removing the dowel from the loom, carrying out the step of cutting with a laser cutter.

In accordance with still another additional mode, there is provided the step of cutting cord holes at least at corners of the individual mask part.

In accordance with a concomitant mode, there is provided the step of securing an elastic ear cord through side pair of cord holes to create a pair of ear-securing loops for each mask part and form a woven personal respirator mask.

Although the systems, apparatuses, and methods are illustrated and described herein as embodied in a woven personal respirator mask and methods of producing same, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which.

DETAILED DESCRIPTION OF THE EMBODIMENTS

Figure 1:
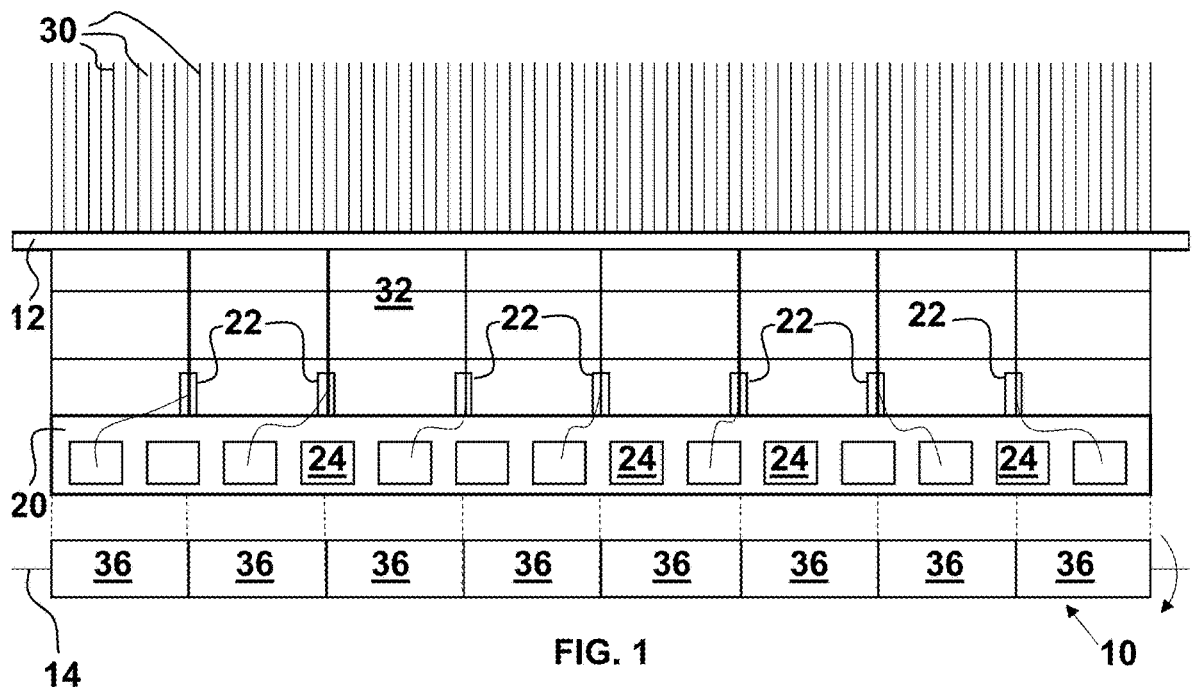
FIG. 1 is a diagrammatic, top plan view of an exemplary embodiment of a Jacquard weaving loom with warp ends partially woven into a repeating mask pattern sheet for woven personal respirator masks and a cutter assembly having seven cutters that cut the sheet into eight strip sheets, each of which rolled around a rolling axle.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIG. 1, there is shown a first exemplary embodiment of a weaving loom 10 used to create a woven personal respirator mask 40. This exemplary embodiment is in a configuration of an electronic woven label loom 10, in that it is either a Rapier or Air-jet loom with an electronic Jacquard weaving machine and downstream hot-wire slitters. Warp ends 30 are fed longitudinally into the loom 10 upstream of a reed or warp beam 12. Up to 10,000 warp ends can be fed into a typical loom 10. The warp beam 12 guides an interior shuttle above and below the warp ends 30 to weave a desired mask pattern 42 in the form of a sheet 32. An example of a sheet 32 of mask patterns 42 is shown in FIG. 2. Upstream of the portion of the sheet 32 shown in FIG. 2 are the warp ends 30. This sheet 32 is woven to have a horizontal set of eight mask patterns 42 in a repeat pattern. Each column of mask patterns 42 forms a strip sheet 36 that, when cut longitudinally between each mask pattern 42, can be rolled into a strip roll 34 that, with an appropriate internal hollow dowel, can be rotated about an axle 14 associated with the loom 10.

After the sheet 32 of sets of the mask pattern 42 is woven, the individual masks 40 are then able to be cut. In an exemplary embodiment shown in FIG. 1, a cutting housing 20 downstream of the warp beam 12 houses cutters 22 that are aligned in parallel with one another and spaced apart from one another along the sheet 32. One cutter 22 is positioned along a centerline between each adjacent mask pattern 42. In this exemplary configuration, a single row of eight mask patterns 42 is cut immediately after being woven into N strip sheets, N being one greater than the number of cutters 22. Thus, with seven cutters 22 shown in the example of FIG. 1, the sheet 32 is cut into eight separate strip sheets 36 of adjacent mask patterns 42. An exemplary embodiment of the cutters 22 includes a thermal cutter described in International Patent Publication WO 2009/061310 to Yidi. The strip sheets 35 can be cut, for example, with a non-illustrated air jet cutter along the, now, single horizontal line defining the boundary between two adjacent mask patterns 42 on each strip sheet 34. The strip sheets 34 can be cut immediately downstream of the cutting housing 20 with non-illustrated cross-cutters or they can be rolled into the strip rolls 36 (shown in FIG. 1) for later cutting of the individual mask patterns 42 into the masks 40. In an alternative embodiment, the cutting housing 200 can be entirely removed and the woven sheet 32 can be rolled into a non-illustrated, single, internal hollow dowel for later cutting. An exemplary embodiment of a cutter that can cut the entire woven sheet 32 in this manner, with the sheet's 32 multiple rows and columns is a Gerber laser cutter.

An area where a hot-wire slitter will cut is referred to as the edge area. The edge area has a cutter guide weave that is configured in a way to account for the melting that the hot-wire slitter creates when cutting the sheet 32. The weave becomes very smooth to the touch where the hot-wire cuts and melts the warp and weave to fuse the edges of each mask pattern 42.

One exemplary embodiment to simplify horizontal cutting of the mask patterns 42 is to leave out one or more weave threads from the shuttle in the warp beam to form a gap between adjacent mask patterns 42. In this manner, cutting of the longitudinal warp ends 30 is only required. A further simplification for cutting can leave out one or more warp ends 30 at the boundary between adjacent mask patterns 42. In this manner, cutting of the horizontal weave threads is only required. Even further, one or more warp ends 30 can be left out at the lateral boundary between adjacent mask patterns 42 and one or more of the weave threads can be left out at the horizontal boundary between adjacent mask patterns 42. In this manner, mask patterns 42 will individually fall out of the downstream end of the warp beam 12.

Figure 27:
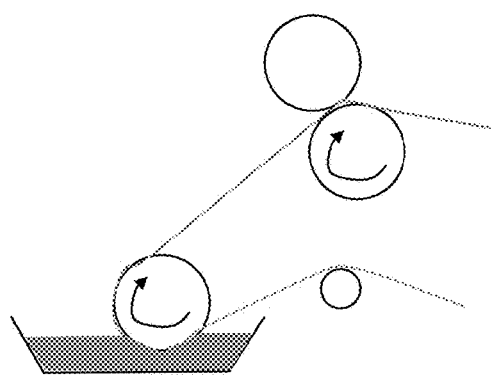
FIG. 27 is a diagrammatic, cross-sectional view of an exemplary embodiment of a Foulard process for coating a fabric.

It has been determined that the loom 10 can produce a particular set of patterns 42 that can be cut into a specially woven mask 40 exceeding N95 requirements. The material of the weaving can take any form and, importantly, it is a material that can be re-used repeatedly, by either placing the mask in hot water or even being placed in an autoclave or other sterilizing processes. With reuse, the user needs to have only one or two masks and never has to throw away any mask. With such protection, elimination of viruses, including COVID-19, becomes possible with use of quarantine and social distancing practices. The mask pattern 42 comprises a weaving of a material including, for example, the warp ends 30 are of a polyester filament between approximately 50 denier/1000 turns per meter (tmp) and approximately 50 denier/1500 tmp. The warp ends 30 also can be approximately 30 denier/2000 tpm. The weft can be texturized polyester of between approximately 30 Denier and approximately 50 Denier. The weave can be of 100% polyester fiber and can be antimicrobial by applying a coating, for example, Agion® or ActiveXL® made by Sciessent of Beverly, Mass. Medical yarns can be used and chemicals can be added to resist blood, for example, ECO-PERL ACTIVE, after production in, for example, a Foulard process and including, if desired, a calendaring, an example of which is depicted in FIG. 27.

Figure 2:
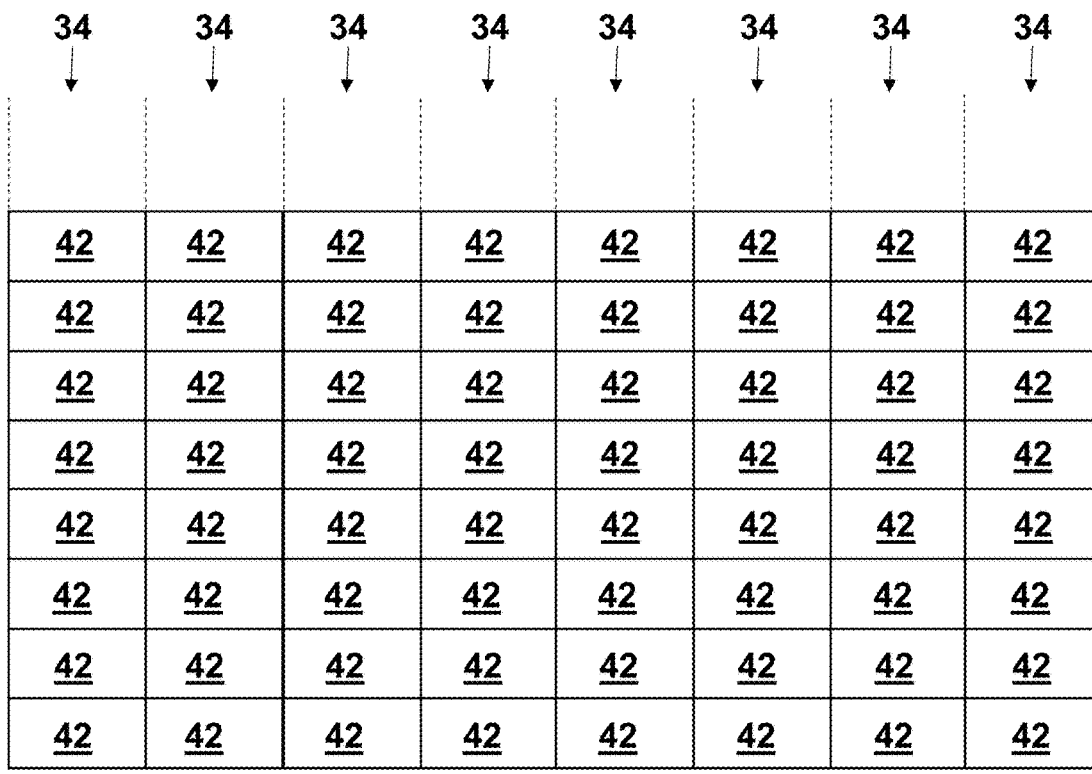
FIG. 2 is a fragmentary, plan view of a section of the repeating mask pattern sheet of FIG. 1 not cut into strip sheets.
Figure 3:
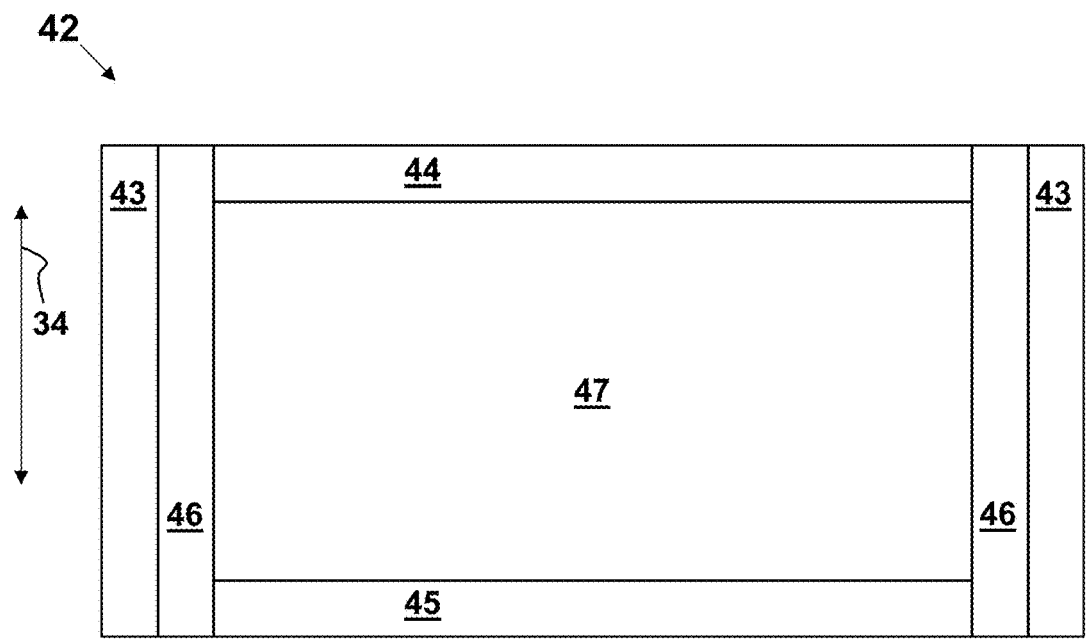
FIG. 3 is a plan view of an exemplary embodiment of a single instance of one of the woven personal respirator masks in the mask pattern sheet of FIGS. 1 and 2.
Figure 4:
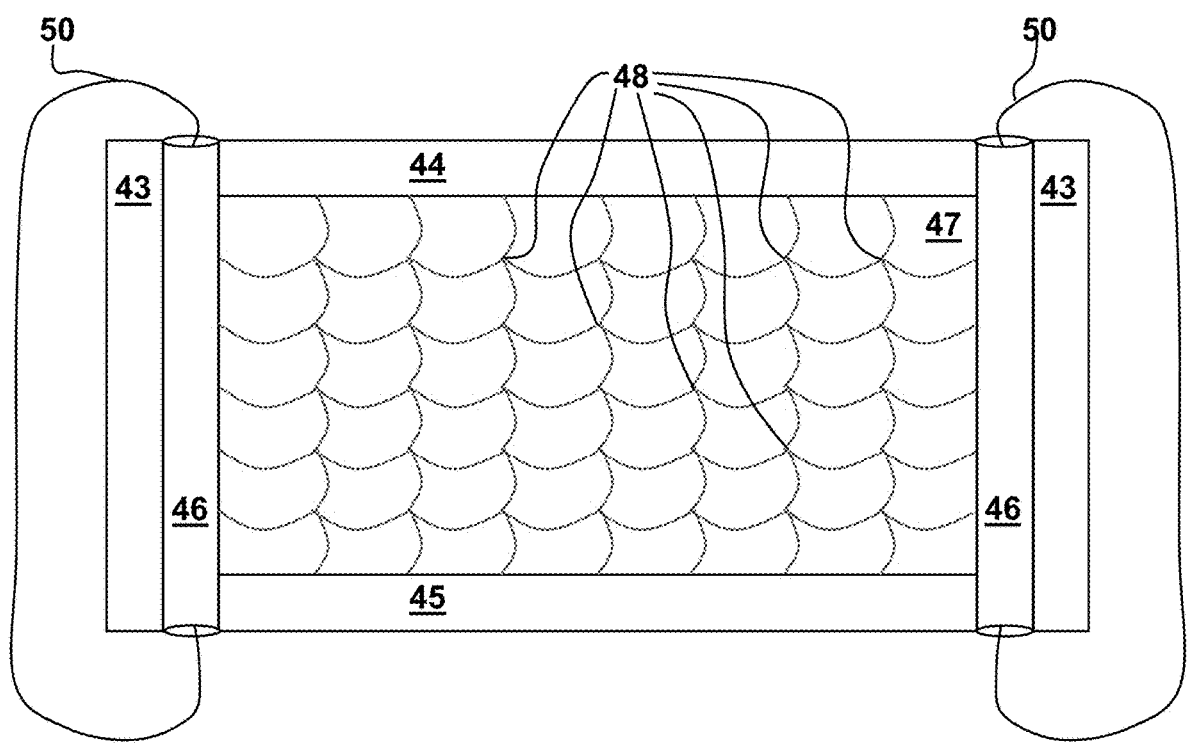
FIG. 4 is a perspective view of an exemplary embodiment of a woven personal respirator mask with the mask pattern of the sheet of FIGS. 1 and 2 with elastic ear cords

A first exemplary embodiment of a rectangular mask pattern 42 is shown in FIGS. 3 and 4 with the longer side of the mask pattern 42 parallel to the warp beam 12 (as in FIG. 2). Of course, the mask pattern 42 can be of any shape but weaving with a loom 10 allows for no waste if a rectangular shape mask pattern 42 extends from one lateral side of the sheet 32 to the opposing lateral side. The mask pattern 42 has first and second opposing lateral sides 43 comprising a weave that has one, two, or three binding points for each thread, which is referred to herein as a tight weave. The tight weave is not tubular and provides two interconnected, inseparable layers. Some examples in the weaving industry of a tight weave is a taffeta weave, which has one binding point for each thread. Another example of a tight weave is a twill weave, which has two or three binding points for each thread.

The mask pattern 42 also has opposing upper 44 and lower sides 45, but the upper and lower sides 44, 45 do not extend all the way to the lateral sides 43. The upper and lower sides 44, 45, in this exemplary embodiment, are of the tight weave. Therefore, the mask pattern 42 has a strong edge about almost the entire periphery thereof. The mask pattern 42 is shown with the lateral sides 43 and the upper and lower sides 44 extending all the way to the edges thereof. In a particularly, desirable embodiment, a small portion of the outer perimeter of the mask pattern 42 (e.g., approximately 1 mm to approximately 3 mm) can be woven differently than these sides 43, 44, 45 in what is referred to as a cutter guide weave. The cutter guide weave is formed by a combination of weaves that create a line. These lines visually can be parallel tracks or set in a V-shape, allowing the weaver to place the hot-wire slitters correctly within the center of the cutter guide weave. In a cutter guide weave allows a hot-wire slitter to cut the material in such a way that the melting of the material forms a fringe-free edge that is virtually smooth to the touch. In an exemplary embodiment, the cutter guide weave is present at all edges where one mask pattern 42 will be cut from another adjacent mask pattern 42 and, at the cutter guide weave can also be present at the extreme lateral sides of the sheet 32, or cutters 22 can be present near these extreme lateral sides to insure a smooth lateral edge to each of the extreme left and right mask patterns 42 of the sheet 32. The upper and lower sides are cut after production of the sheet 32 or the strip rolls 36 using a hot-wire knife or a laser, for examples. The sides 43, 44, 45 together define an edge border.

Figure 28:
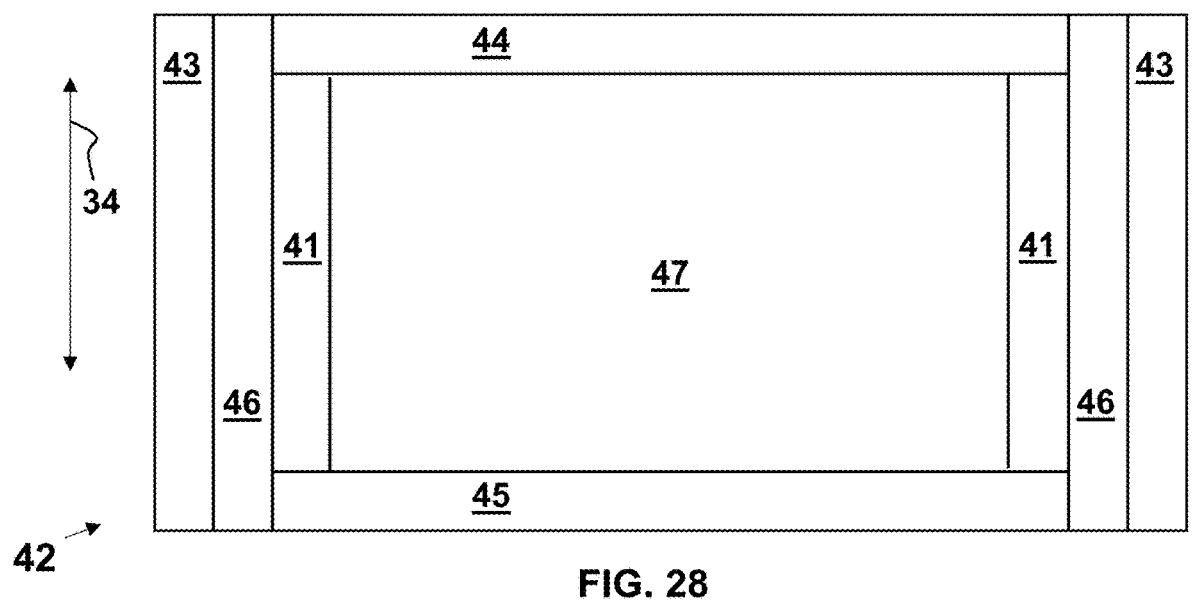
FIG. 28 is a plan view of another exemplary embodiment of a single instance of one of the woven personal respirator masks in the mask pattern sheet of FIGS. 1 and 2 with tube supports.
Figure 29:
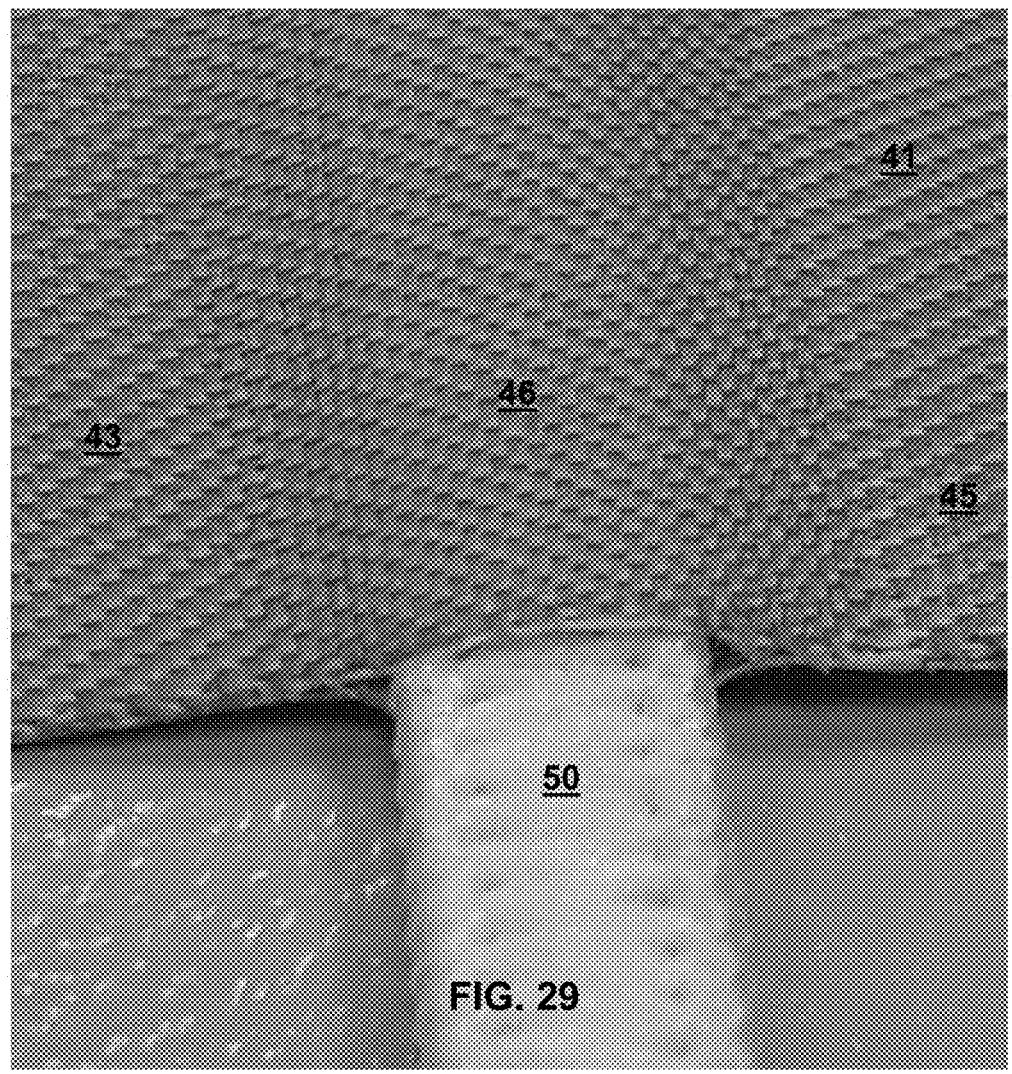
FIG. 29 is a fragmentary, enlarged perspective view of a corner of an alternative to the mask of FIG. 11 with woven tube supports of the mask pattern of FIG. 28.

The vertically rectangular space between the two sets of sides 43, 44, 45 is formed by a woven tube 46, which the loom 10 is able to weave at the same time as non-tubular weaving patterns, such as for the two sets of sides 43, 44, 45. The woven tubes 46 have a weave that is different from the tight weave because of its tubular weave construction. The woven tubes 46 can have a tube with the tight weave (e.g., having two or three binding points for each thread), however, the woven tubes 46 can also have a looser weave of four, five, or eight binding points for each thread. An example in the weaving industry of a weave having five to eight binding points is a satin weave. The woven tubes 46 are depicted in FIG. 4 and form a path through which elastic ear cords 50 may be installed. It may be desirable to provide support to both sides of the woven tubes 46. In such an exemplary configuration variant, shown in FIGS. 28 and 29, a tube support 41 is provided at the left and right sides of the filter section 47 to define a right supporting boundary for the left woven tube 46 and to define a left supporting boundary for the right woven tube 46. The support to the bottom of the left woven tube 46 is depicted, for example, in FIG. 29. The right and left tube supports 41 have the tight weave.

In between the upper and lower sides 44, 45 and the woven tubes 46 is an intermediate filter section 47. The filter section 47 is woven in the same manner as the tubular woven tubes 46, in that, there are two woven sheets apart from one another between the four edges (top, bottom, left, and right), but the tubular nature of the weave is far greater along the weaving axis—the tube has a diameter that is equal to the distance between the two woven tubes 46. As all four edges are sealed, the filter section 47 forms a sort of "pillow" that contains an air gap between the two opposing woven sheets (which define the front of the filter section 47 and the rear of the filter section 47). The weave of the filter section 47 has two, three, or four binding points for each thread, which is referred to herein as a filter weave and is substantially similar to the tight weave. The pillowed filter section 47 need not be simply a pillow that allows the front and back sides thereof to form a large space therebetween. Because the internal extent is so large, a beneficial exemplary embodiment tacks portions of the front and back sides of the filter section 46 together. The loom 10 is able to weave the filter section 47 with intermediate interlocks 48 that hold both of the front and back layers with respect to one another at each interlock 48 but allow an air-filled pillow to form where the interlocks 48 are not present and, in doing so, create a respirator filter. The weave of the interlocks 48 on the front face of the filter section 47 can have many different thread ratios, including, for example, 3, 4, 7, 8, 12, 16, and 18 binding points for each thread. The front or outer face as referred to herein is the side of the filter section 47 that faces away from a user of the mask. For the inner or rear face of the filter section 47, the interlock has any weave that is compatible with the form of the weave used for the front face of the interlocks 48.

In an exemplary embodiment, the weave of the lateral sides 43 and the upper and lower sides 44, 45 of the mask 40 is between approximately 55 threads/cm and approximately 250 threads/cm. In a further exemplary embodiment, the weave is between approximately 130 threads/cm and approximately 220 threads/cm.

In an exemplary embodiment, the weave of the woven tube 46 of the mask 40 is between approximately 55 threads/cm and approximately 250 threads/cm. In a further exemplary embodiment, the weave is between approximately 130 threads/cm and approximately 220 threads/cm.

In an exemplary embodiment, the weave of the filter section 47 of the mask 40 is between approximately 55 threads/cm and approximately 250 threads/cm. In a further exemplary embodiment, the weave is between approximately 130 threads/cm and approximately 220 threads/cm.

In an exemplary embodiment, the weave of the tie-down interlocks is between approximately 45 picks/cm and approximately 120 picks/cm. In a further exemplary embodiment, the weave is between approximately 48 picks/cm to 75 picks/cm. In still a further exemplary embodiment, the weave is approximately 80 picks/cm. Significantly, the interlocks 48 can form a watermark in any shape, for example, it can be a series of letters to form a name or trademark and/or it can be a design to form a trademark logo.

In the exemplary embodiment of FIGS. 1 and 2, the mask pattern 42 is repeated horizontally in the loom 10 to create eight mask patterns 42 in each row. The loom 10 can be adjusted to create at least 5 and up to 12 mask patterns in each row. Also, the mask pattern 42 can be rotated ninety degrees to have the longer side extend parallel to the weaving direction. As the mask pattern 42 is substantially rectangular, the mask pattern 42 is repeated with a higher number for each horizontal row as compared to the mask pattern 42 in FIGS. 1 and 2.

The loom 10 as shown has one warp beam 12 but it can have more, for example, up to four warp beams. With each additional warp beam 12, the quality of the filtration can be increased. With a second warp beam 12, the mask pattern 42 can have a third layer to provide a third filter layer in the filter section 47, this is from the same loom. An exemplary embodiment of this third layer can be, e.g., a polyester filament yarn of approximately 30 Denier to approximately 50 Denier with between approximately 1000 tmp to approximately 2000 tpm.

The weaving of the mask pattern 42 can also leave out some warp threads to open up the intermediate filter section 47 into a pocket, into which a secondary filter material can be placed. Examples of this secondary filter material include, but are not limited to, nonwoven filtration fabrics (such as needlefelts produced from staple fibers, wetlaid produced from short-cut fibers, spunbond, meltblown fabrics, tea bag paper, face cloths, shingling and synthetic fiber paper, composite, carded/carding, needle punch, thermal bonded, chemical bonded, nanotechnology), activated carbon filter material. This pocket can also allow the use of a separate firm frame piece (for example, a piece of aluminum) that allows the user to bend the frame piece to customize a shape of a portion of the mask, for example, at the nose portion upper edge to allow the user to bend the frame piece around the user's nose.

Figure 5:
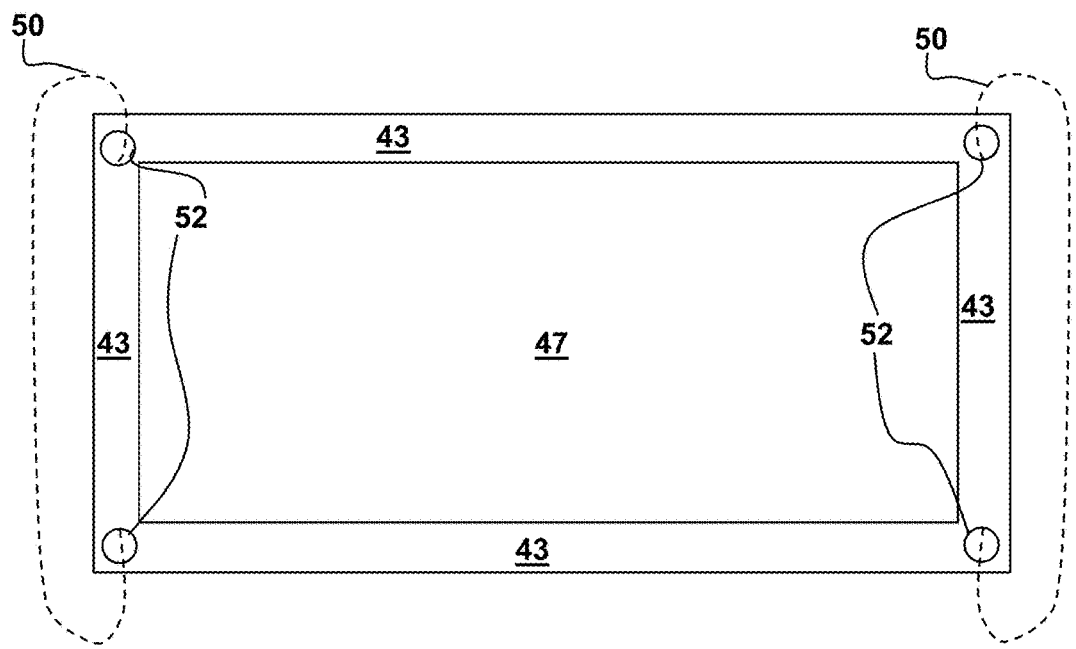
FIG. 5 is an alternative exemplary embodiment of a single mask pattern for a repeating mask pattern sheet woven by an electronic woven label loom with ear cord cutouts for receiving respective elastic ear cords.
Figure 6:
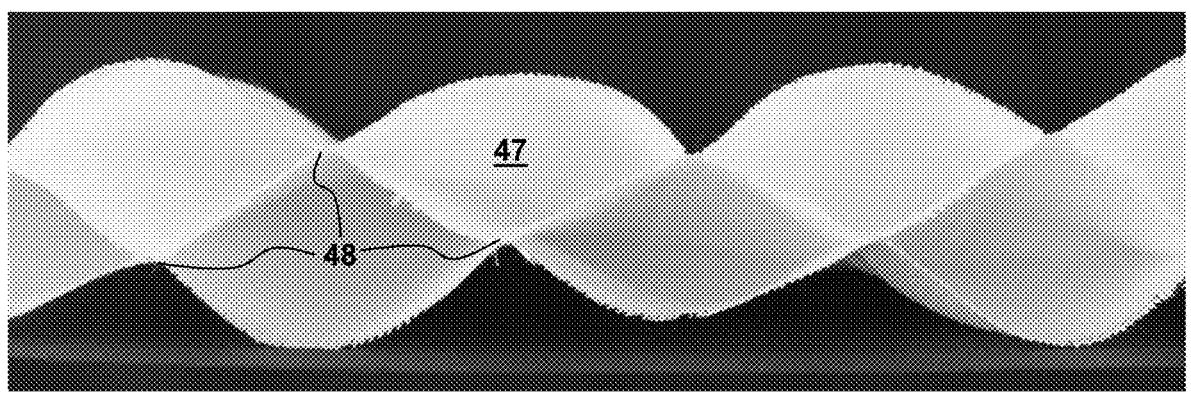
FIG. 6 is a fragmentary, enlarged, cross-sectional view of an exemplary embodiment of a filter section of a woven personal respirator mask with a three-dimensional pocket.
Figure 7:
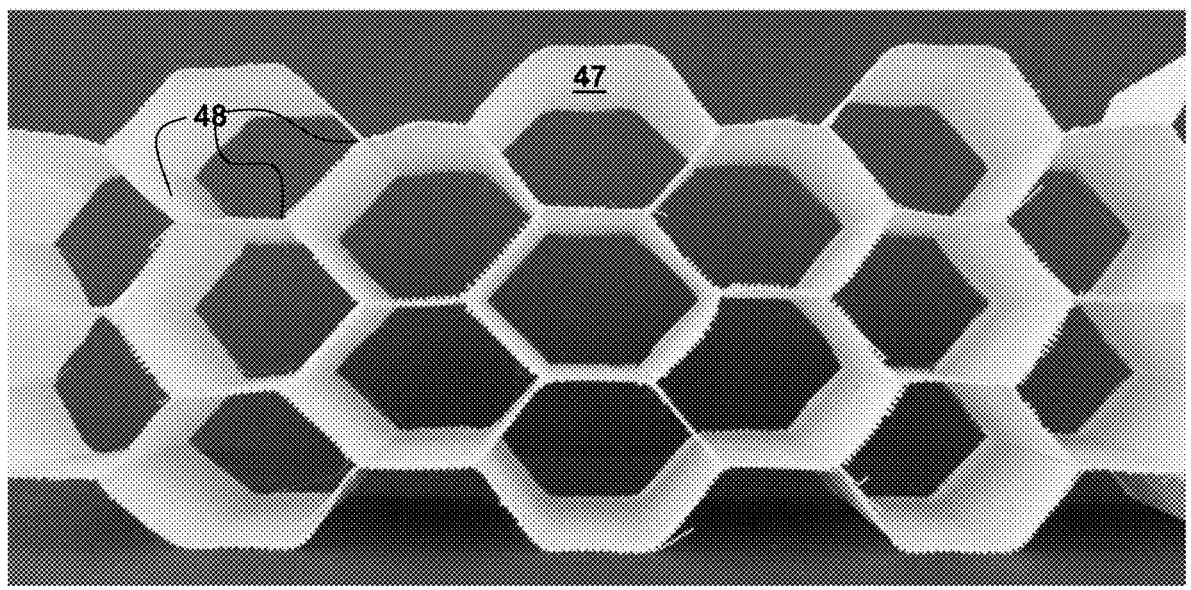
FIG. 7 is a fragmentary, enlarged, cross-sectional view of another exemplary embodiment of a filter section of a woven personal respirator mask.

As an alternative to the vertical woven tube 46 to form a pocket for the elastic ear cords 50, four (or more) cord holes 52 can be formed, with at least one at each corner of the mask 40, for threading in the elastic ear cord 50 therethrough. This exemplary configuration is shown in FIG. 5. The holes 52 can be woven or they could be formed by a laser cutter, such as the Gerber laser cutter.

Figure 8:
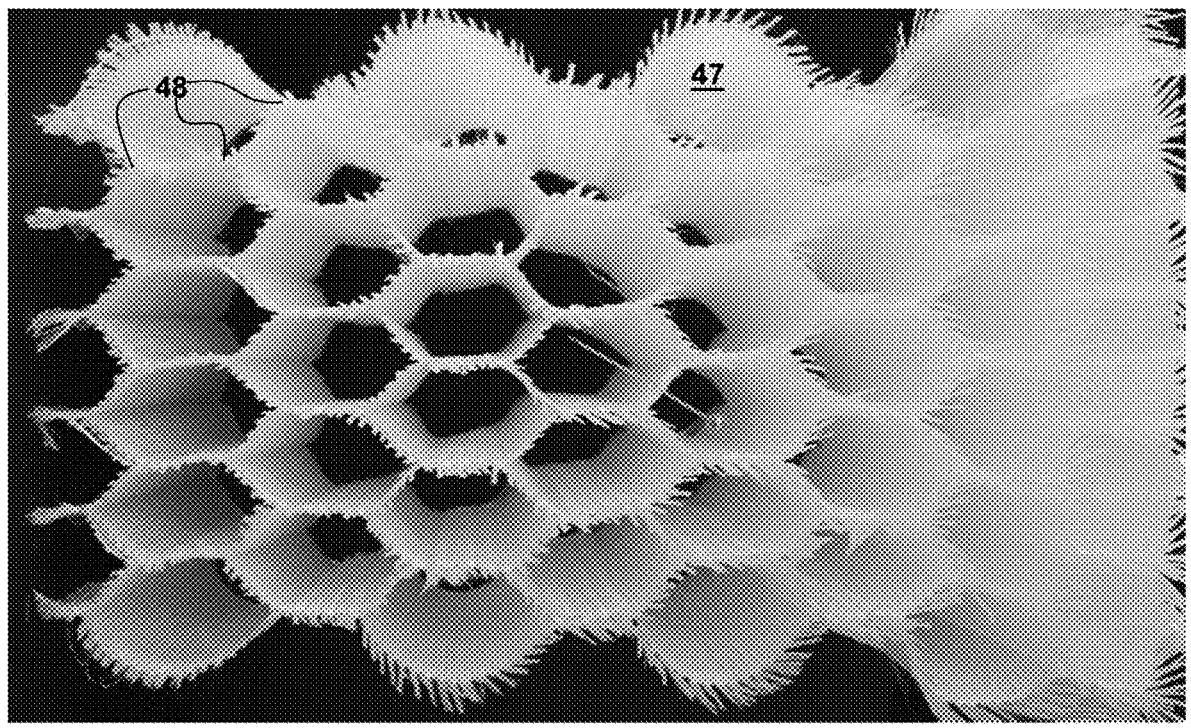
FIG. 8 is a fragmentary, enlarged, cross-sectional view of another exemplary embodiment of a filter section of a woven personal respirator mask.
Figure 9:
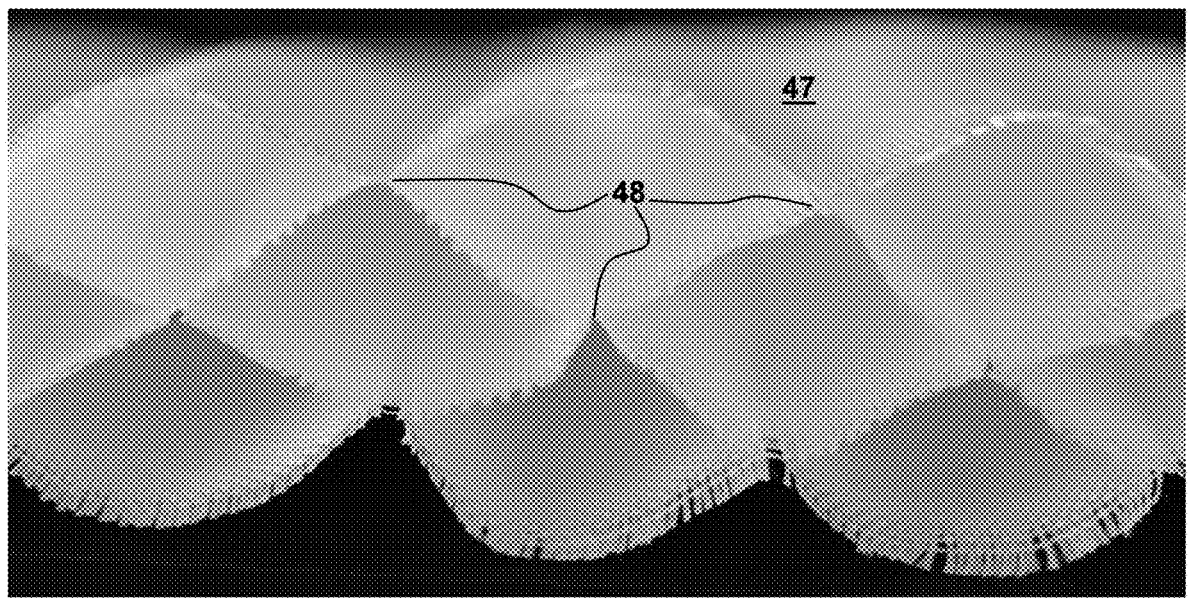
FIG. 9 is a fragmentary, enlarged, cross-sectional view of another exemplary embodiment of a filter section of a woven personal respirator mask.
Figure 10:
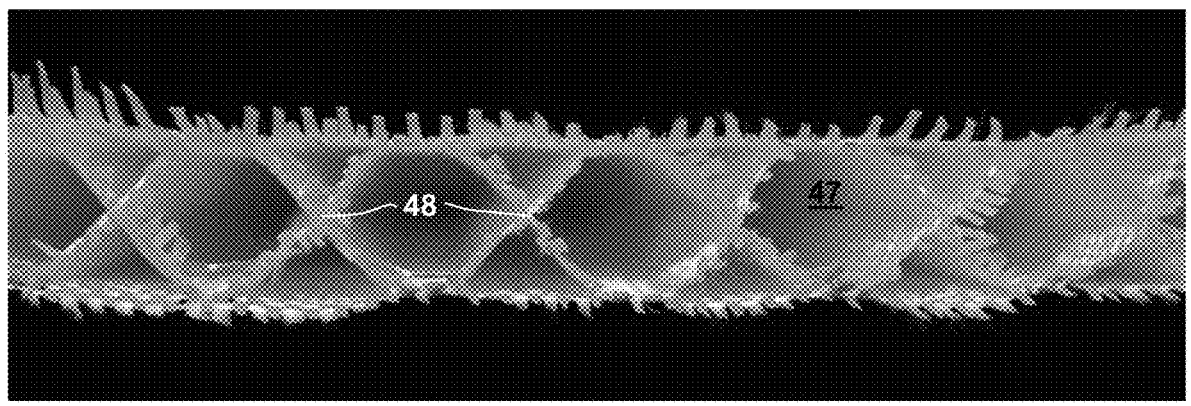
FIG. 10 is a fragmentary, enlarged, cross-sectional view of another exemplary embodiment of a filter section of a woven personal respirator mask.

The tubular fabrics woven by the loom 10 have profiled surfaces with oblique woven connections (e.g., in a diamond shape). These connections can be in combination with horizontal connections as in, for example, a honeycomb structure, which structures are depicted in FIGS. 5 through 9. A length of the different sides can be customized, as well as the thickness of the different layers. A maximum height is six tubes on top of each other, as shown in FIG. 8. Alternatively, tubular fabrics woven by the loom 10 with flat faces and oblique connections have also woven connections under an angle that can be customized. This type of woven connections improves resistance against shear and is shown, for example, in FIG. 10.

A tubular fabric is characterized by the hollow spaces in the three-dimensional woven fabric. These hollow spaces can be customized in shape and dimension. The surfaces can be profiled or flat, each with several different connection possibilities. With profiled faces oblique or oblique in combination with horizontal connections, for example, a honeycomb structure is made possible. Flat surfaces can have vertical connections, oblique connections, or a combination of oblique and horizontal connections. These openings can be used for various utilities. For example, they can be filled with a reinforcement matrix, with foam, and other materials and devices.

It is also possible to add different yarn types by adding a complete color in one using an additional weft insertion, for example, one man-made mixture with cotton and one natural (e.g., cotton). In this way, the feel of the woven mask, in particular the filter section 47, on a user's face can be softer by the addition of the natural material, such as cotton or poly-cotton.

Figure 11:
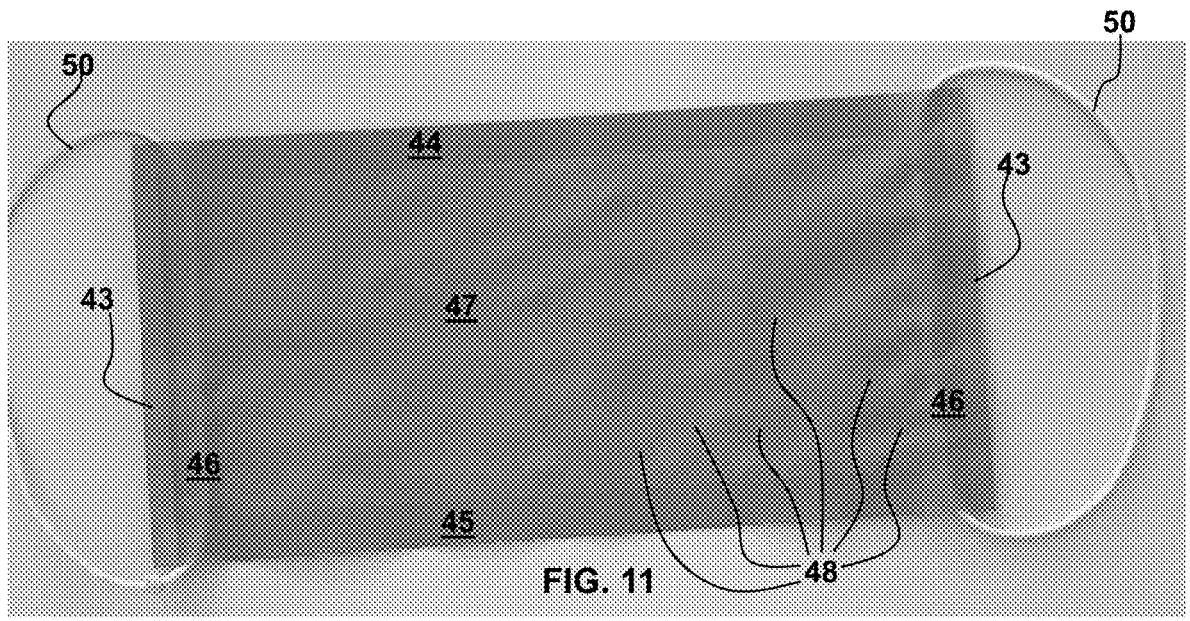
FIG. 11 is a fragmentary, plan view of an exemplary embodiment of a woven personal respirator mask.
Figure 12:
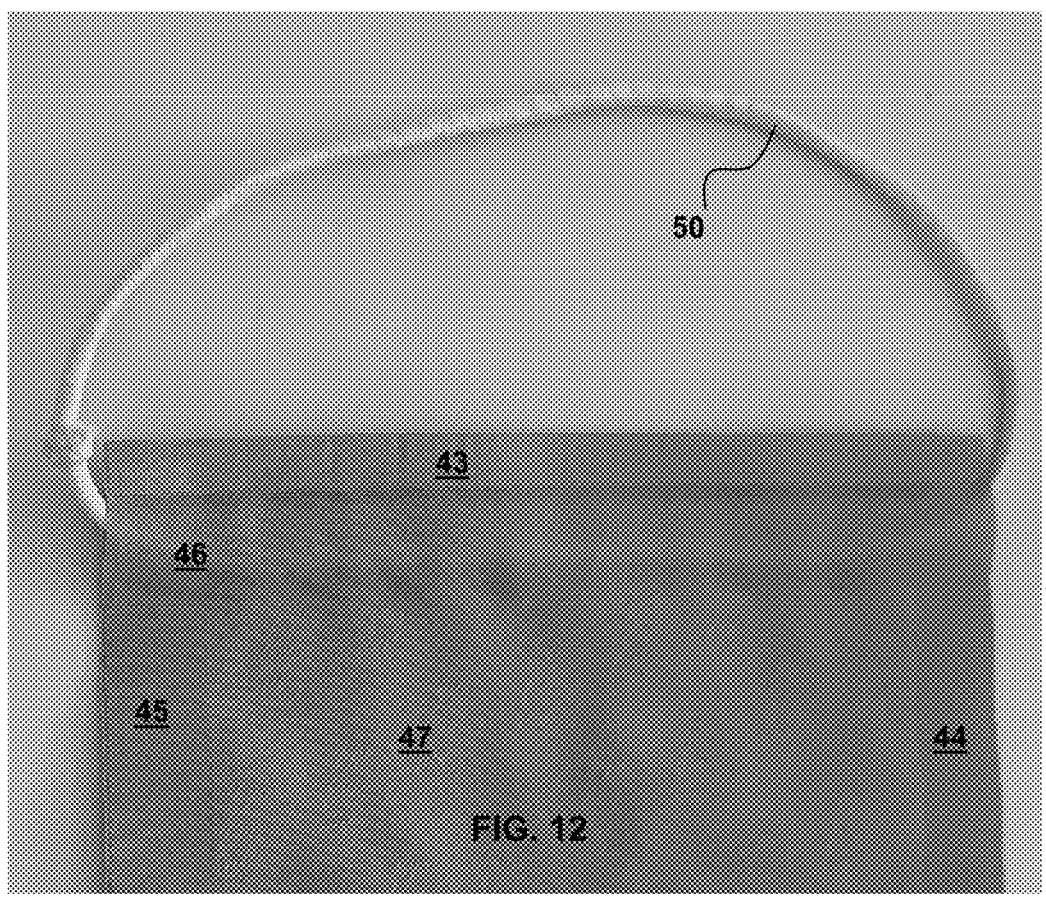
FIG. 12 is a fragmentary, enlarged plan view of a left side of the mask of FIG. 11.
Figure 13:
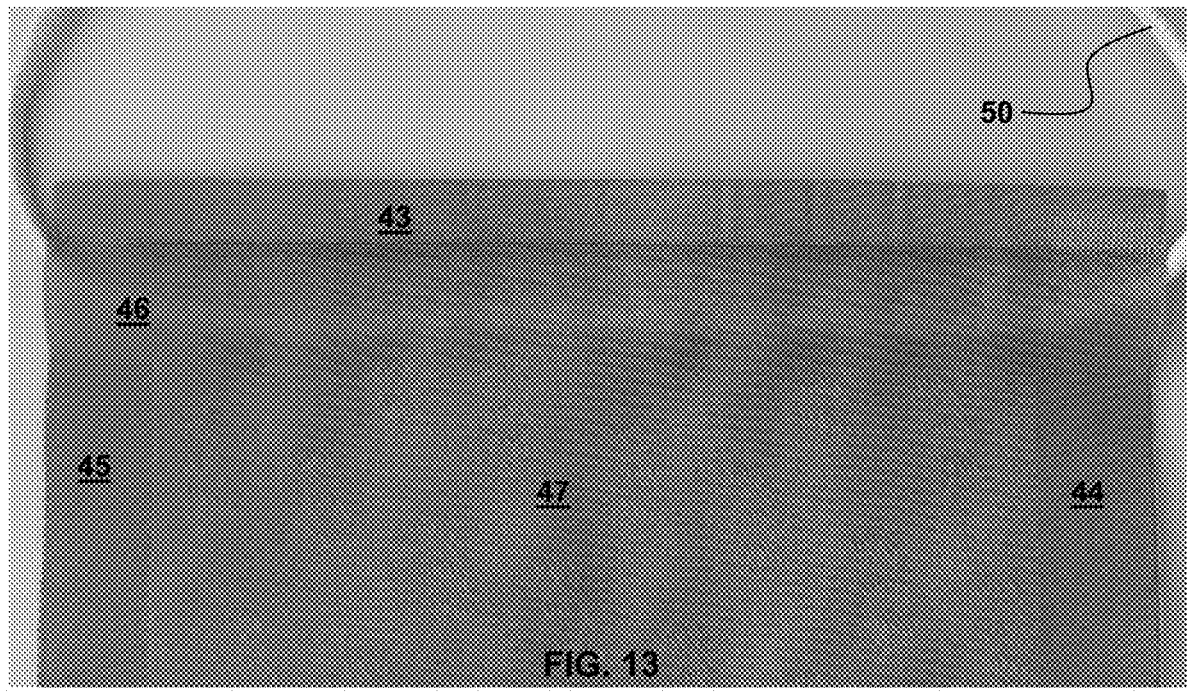
FIG. 13 is a fragmentary, enlarged plan view of a right side of the mask of FIG. 11.
Figure 14:
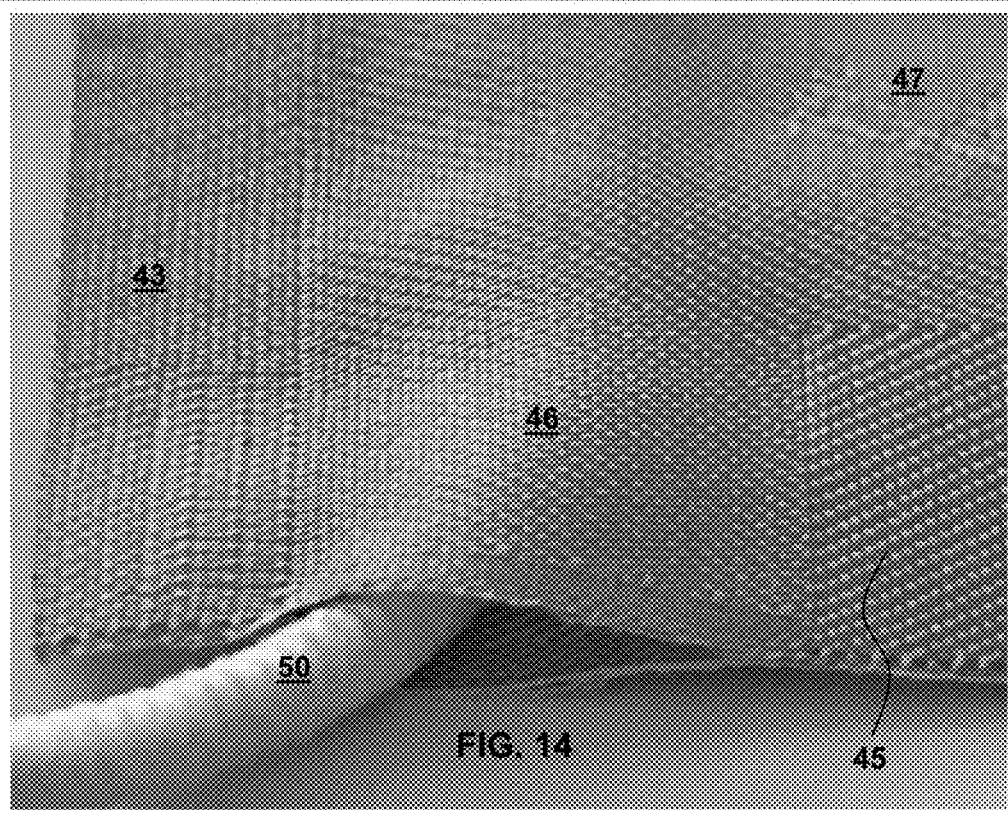
FIG. 14 is a fragmentary, enlarged perspective view of a corner of the mask of FIG. 11.
Figure 15:
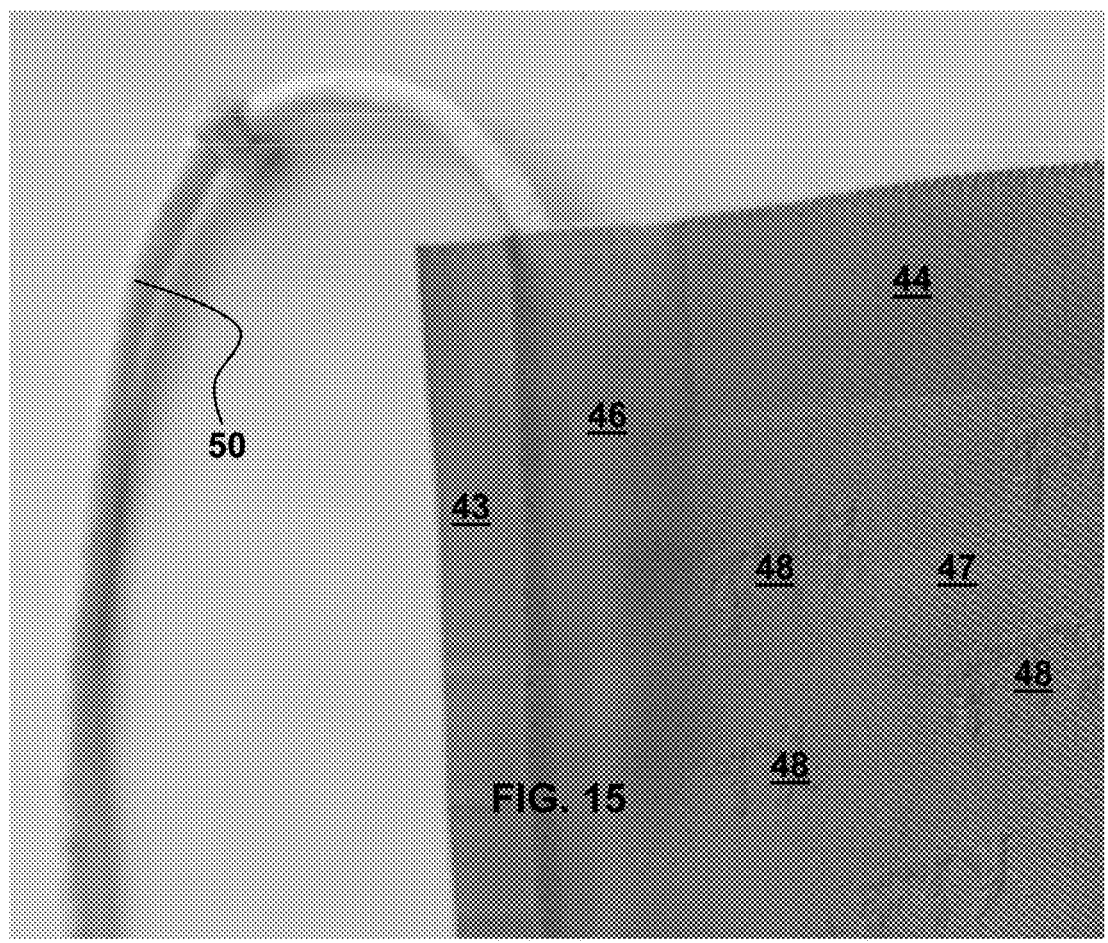
FIG. 15 is a fragmentary, enlarged perspective view of a corner of the mask of FIG. 11.
Figure 16:
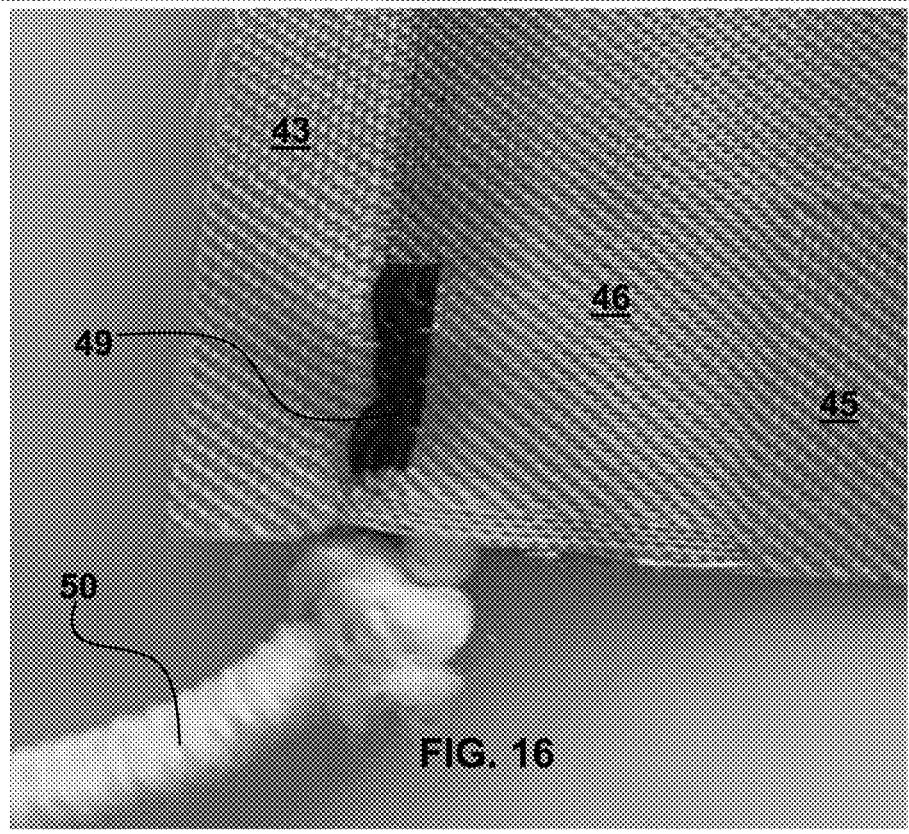
FIG. 16 is a fragmentary, enlarged perspective view of a corner of the mask of FIG. 11 including an exemplary embodiment of a register mark for further use in cutting machines.
Figure 17:
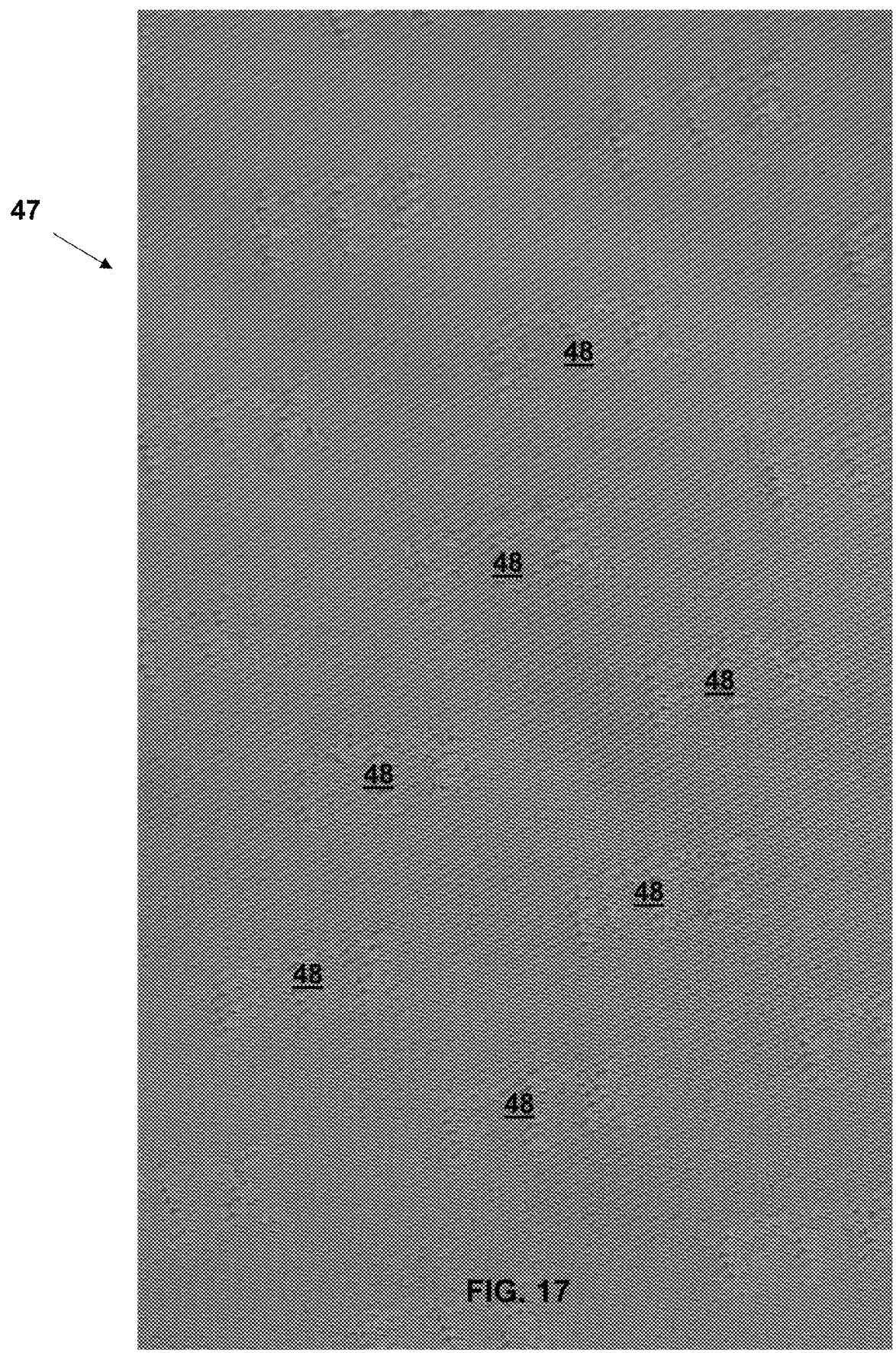
FIG. 17 is a fragmentary, enlarged plan view of a filter section of the mask of FIG. 11 with interlocks in the letters "FTX", as an exemplary watermark.

FIGS. 11 to 17 show various configurations of a woven personal respirator mask 40. FIG. 11 shows the entire mask 40. FIG. 12 shows a left side of the mask and FIG. 13 shows the right side. FIG. 14 is enlarged to show the woven tube 46 at a corner of the mask 40. FIG. 15 shows an upper corner of the mask 40 and FIG. 16 shows an enlarged corner portion of the mask with a register mark 49 for use in cutting machines that require such a mark 49. FIG. 17 shown an enlarged portion of the filter section 47 of the mask 40 with interlocks 48 in the shape of an exemplary watermark using the letters "FTX."

Figure 18:
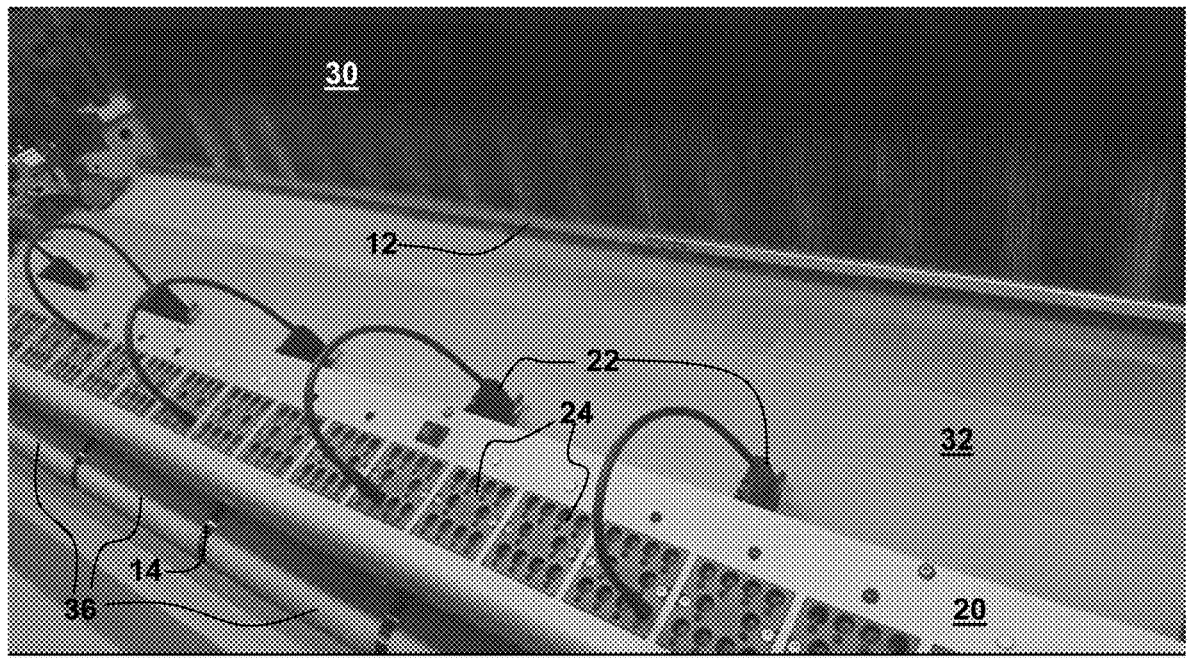
FIG. 18 is a fragmentary, perspective view of a portion of a left side of an electronic woven label loom with warp ends partially woven into a repeating mask pattern sheet for woven personal respirator masks and a cutter assembly having seven cutters that cut the sheet into eight strip sheets, each of which rolled around a rolling axle.
Figure 19:
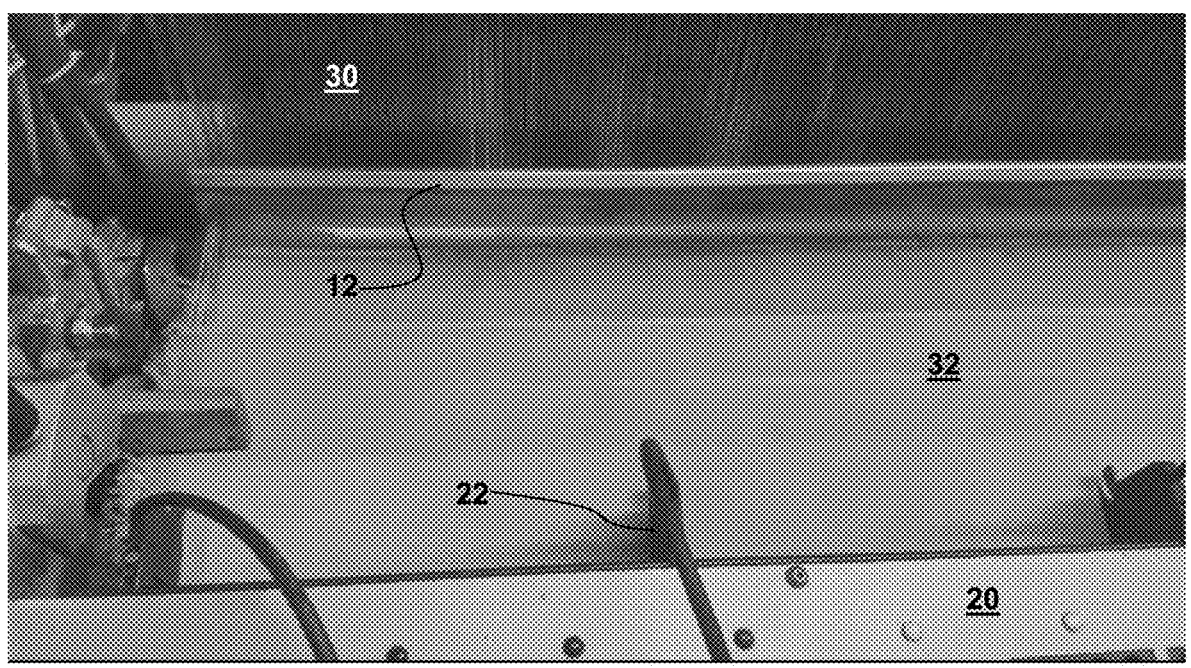
FIG. 19 is a fragmentary, enlarged view of a first portion of the left side of the loom of FIG. 18.
Figure 20:
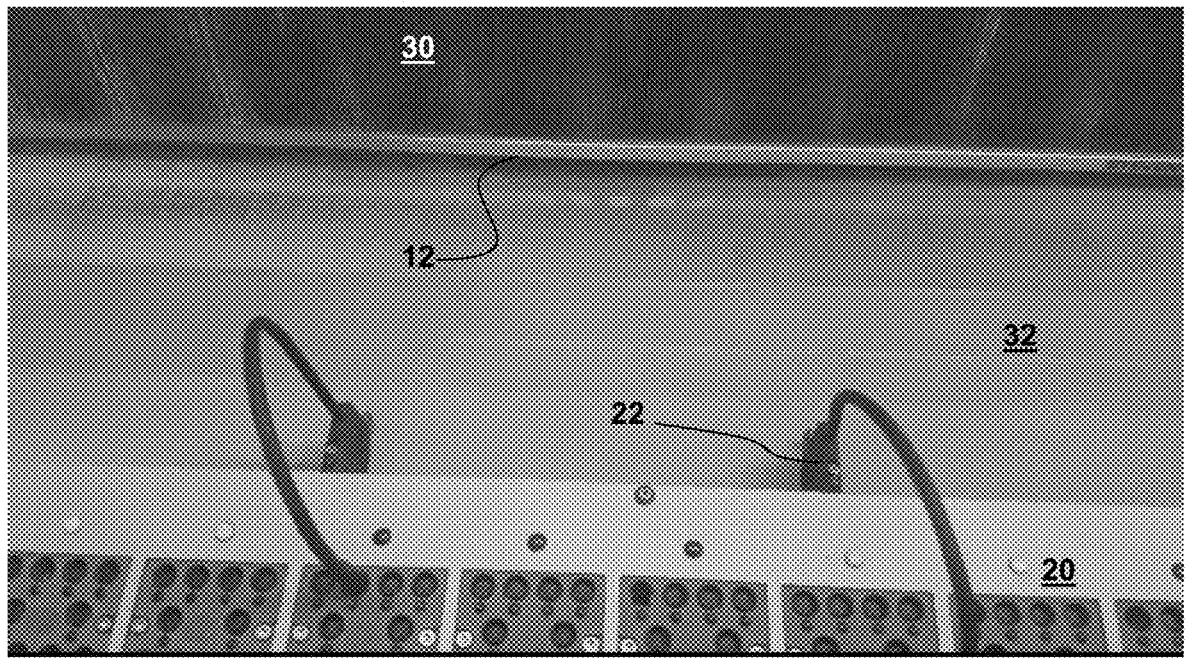
FIG. 20 is a fragmentary, enlarged view of a second portion of the loom of FIG. 18 to the right of the portion of FIG. 19.
Figure 21:
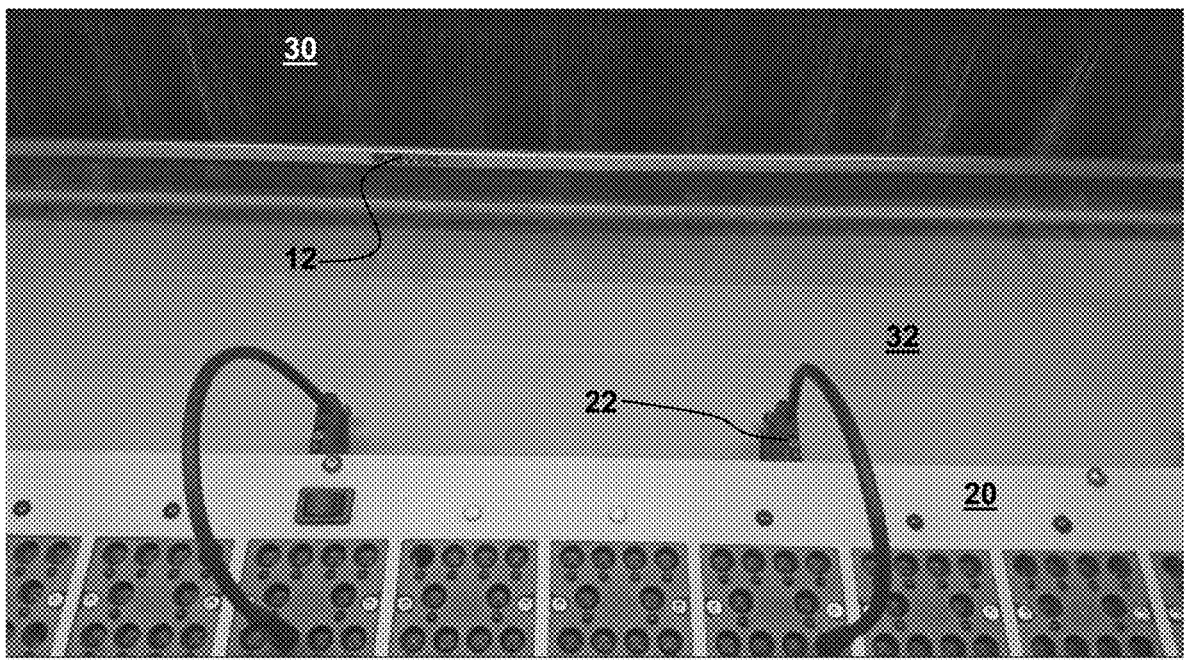
FIG. 21 is a fragmentary, enlarged view of a third portion of the loom of FIG. 18 to the right of the portion of FIG. 20.
Figure 22:
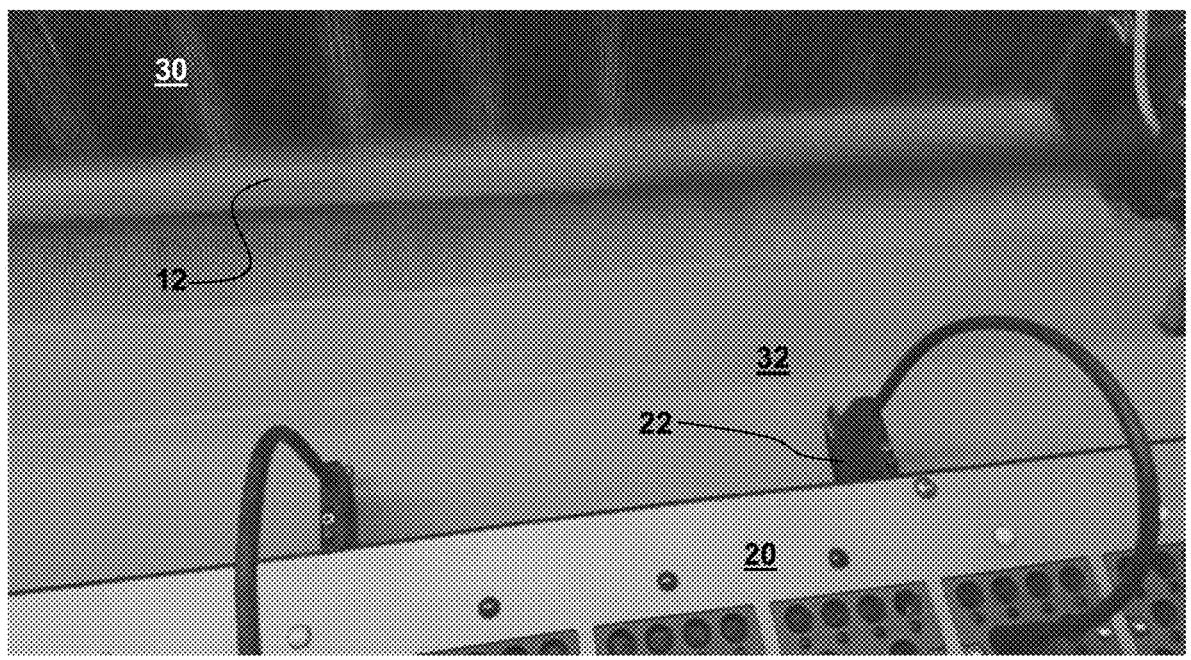
FIG. 22 is a fragmentary, enlarged view of a fourth portion of the loom of FIG. 18 to the right of the portion of FIG. 21.
Figure 23:
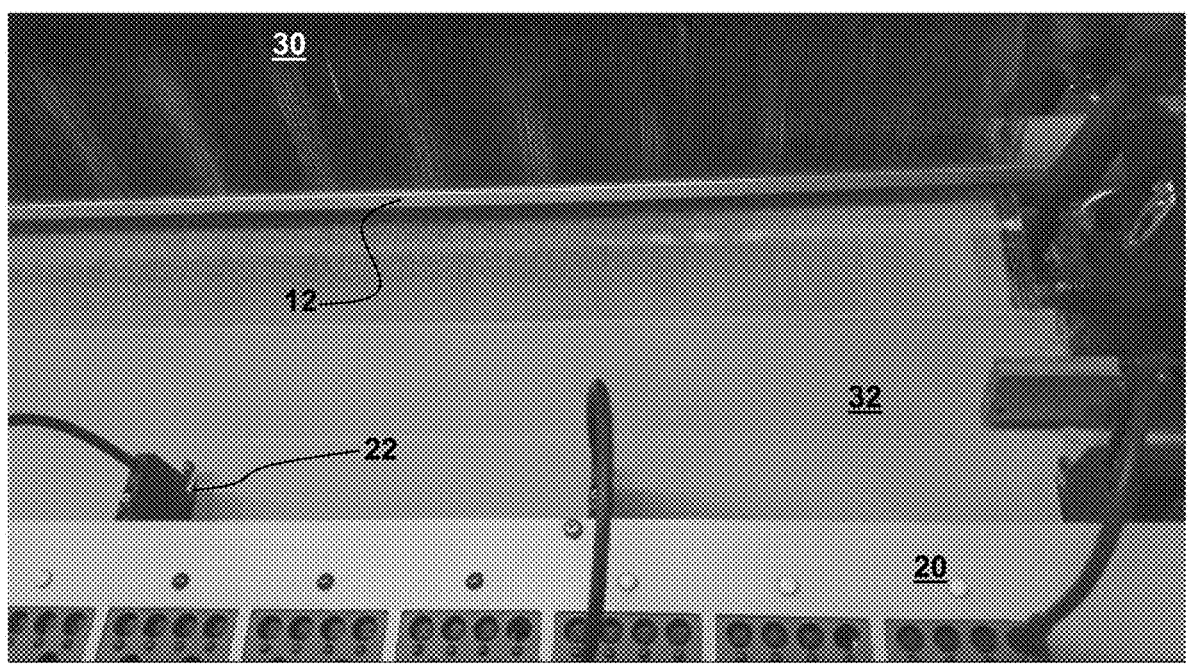
FIG. 23 is a fragmentary, enlarged view of a fifth portion of the right side of the loom of FIG. 18 to the right of the portion of FIG. 20.
Figure 24:
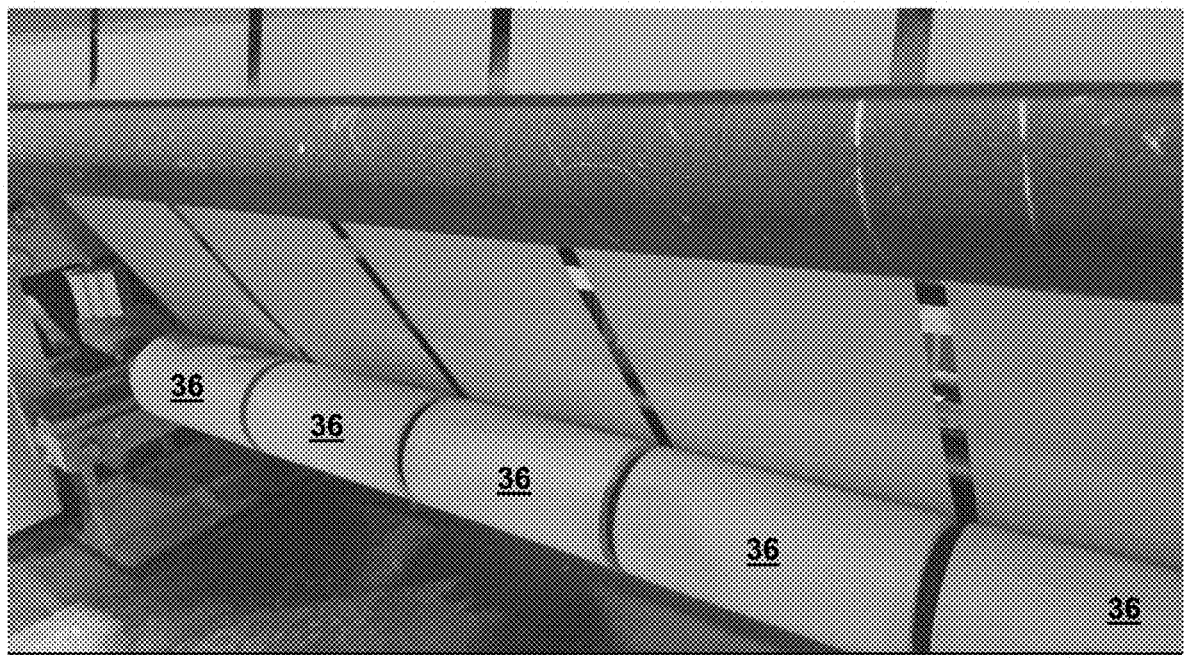
FIG. 24 is a fragmentary, enlarged view of a first portion of the left side of the strip rolls of the loom of FIG. 18.
Figure 25:
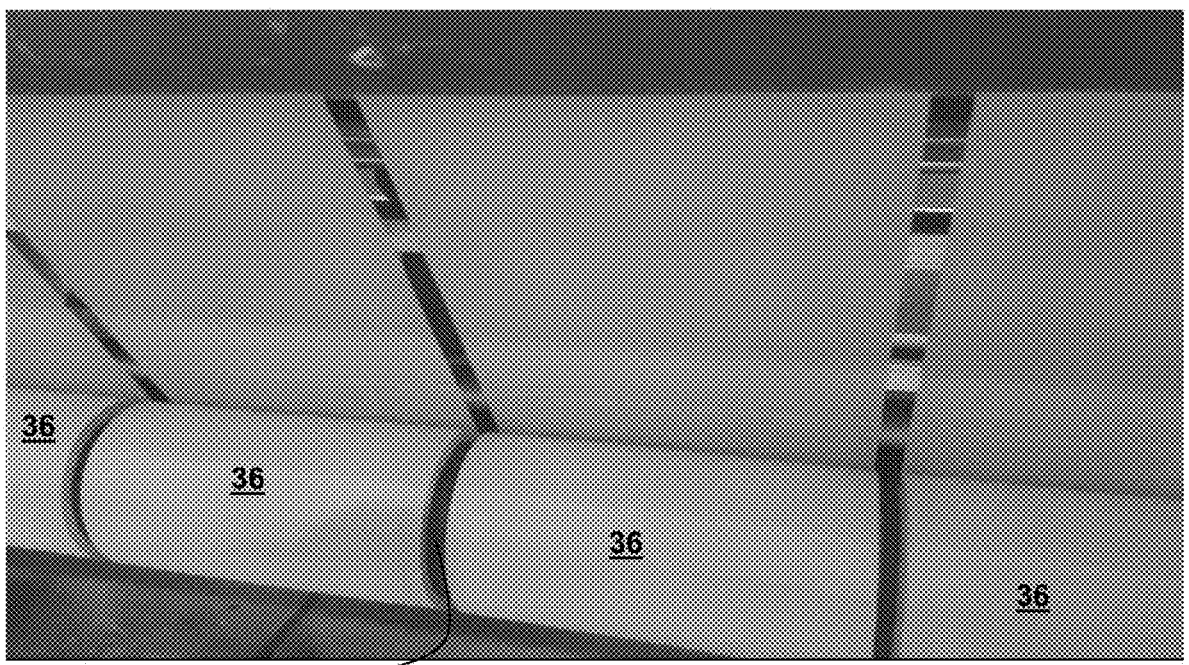
FIG. 25 is a fragmentary, enlarged view of a second portion of the loom of FIG. 18 to the right of the portion of FIG. 24.
Figure 26:
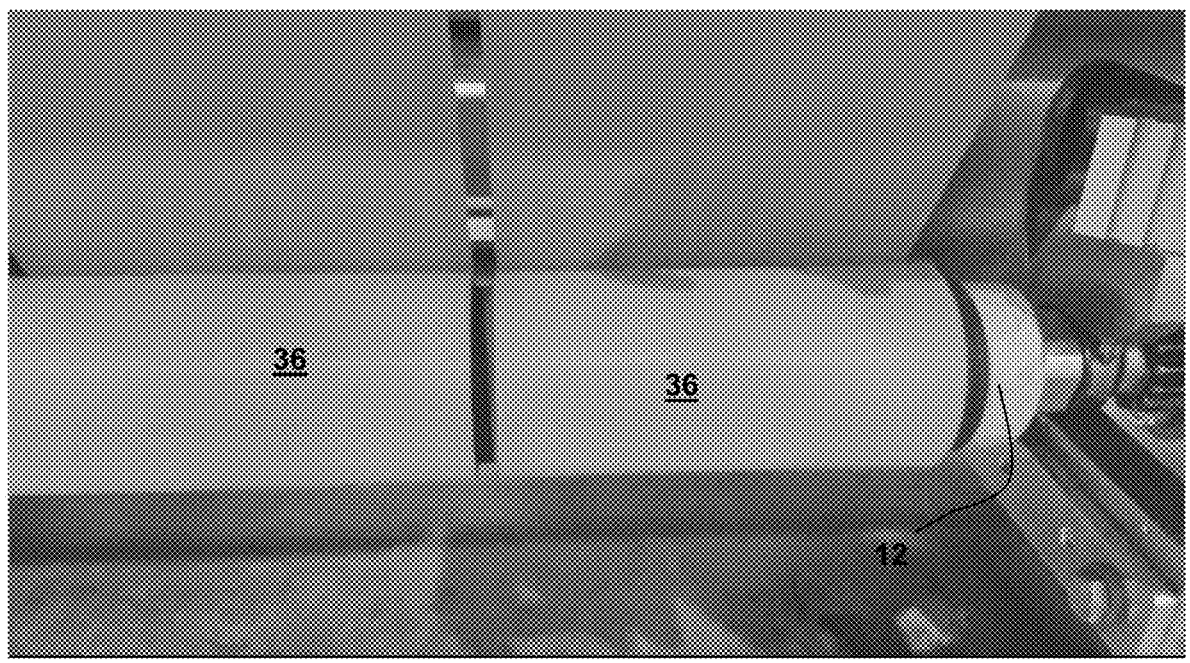
FIG. 26 is a fragmentary, enlarged view of a third portion of the right side the loom of FIG. 18 to the right of the portion of FIG. 25.

FIGS. 18 to 24 show various portions of a Jacquard weaving loom 10 with a downstream cutting housing 20 having hot-wire slitters 22 with respective cutter power supplies 24. FIG. 18 shows the a left side of the loom 10 the warp ends 30 partially woven into the sheet 32 of repeating mask patterns 42. In this exemplary embodiment, the cutter assembly has the cutting housing 20, seven hot-wire slitters 22 that cut the sheet 32 into eight strip sheets 34, each of the strip sheets 34 being rolled around a rolling axle 14. FIGS. 19 to 23 shows a progression of the loom 10 from the left side to the right side. FIGS. 24 to 26 show a progression of the axle 12 on which are the strip rolls 36.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. A method for producing a woven personal respirator mask, which comprises:
    providing a plurality of warp ends into a weaving loom;
    programming the loom to weave the warp ends into a sheet having a repeating mask pattern in a weft direction, the mask pattern comprising:

an upper edge;
a lower edge;
a left lateral side having a tight weave;
a right lateral side having the tight weave;
an upper side having the tight weave;
a lower side having the tight weave;
a left woven tube extending parallel to the warp ends from the upper edge to the lower edge, having a tubular weave, and comprising:
an upper end at the upper edge between the left lateral side and a left end of the upper side; and
a lower end at the lower edge between the left lateral side and a left end of the lower side;
a right woven tube extending parallel to the warp ends from the upper edge to the lower edge, having a tubular weave, and comprising:
an upper end at the upper edge between the right lateral side and a right end of the upper side; and
a lower end at the lower edge between the right lateral side and a right end of the lower side;
a filter section having a tubular weave to define an outer layer and an inner layer and defined by an upper edge of the lower side, a lower edge of the upper side, a right edge of the left woven tube, and a left edge of the right woven tube, at least one of the outer layer and an inner layers comprising a filter weave; and
at least one intermediate interlock fastening at least a point of the outer layer to an opposing point on the inner layer;
cutting the sheet to separate the repeating mask pattern into individual mask parts; and
securing an elastic ear cord through each of left and right woven tubes to create a pair of ear-securing loops for each mask part and form a woven personal respirator mask.

2. The method according to claim 1, wherein the weaving loom is an electronic woven label loom and the step of cutting is carried out by cutting the repeating mask pattern into individual mask parts with hot-wire slitters.

3. The method according to claim 1, wherein the weave of the lateral sides, the upper and lower sides, and the woven tubes is one of:
between approximately 55 threads/cm and approximately 250 threads/cm; and
between approximately 130 threads/cm and approximately 220 threads/cm.

4. The method according to claim 1, wherein the weave of the filter section is one of:
between approximately 50 threads/cm and approximately 250 threads/cm; and
between approximately 120 threads/cm and approximately 210 threads/cm.

5. The method according to claim 1, wherein the interlocks are a plurality of picks having one of:
between approximately 45 picks/cm and approximately 120 picks/cm to pillow the outer and inner layers; and
between approximately 48 picks/cm and approximately 75 picks/cm to pillow the outer and inner layers.

6. The method according to claim 1, wherein the interlocks form watermarks in a shape of at least one of a series of letters, a name, a trademark, and logo.

7. The method according to claim 1, which further comprises preventing the inner and outer layers from moving with respect to one by adding a plurality of the interlocks.

8. The method according to claim 1, which further comprises forming the weave and the warp ends of a material selected from at least one of 100% polyester fiber, a polyester fiber blend, a 100% polyester filament with a level of twist up to 2000 turns per meter.

9. The method according to claim 8, wherein the material is reusable, autoclavable, and sterilizable.

10. The method according to claim 1, which further comprises coating the mask pattern with at least one of:
an antimicrobial; and
a blood-resistant chemical.

11. The method according to claim 1, which further comprises weaving the warp ends with between one and three warp beams.

12. The method according to claim 1, which further comprises weaving the mask pattern to leave out at least one warp end to form the filter section into a pocket.

13. The method according to claim 12, which further comprises placing a secondary filter material into the pocket of the filter section, the secondary filter material comprises at least one of nonwoven filtration fabrics, needlefelts produced from staple fibers, wetlaid produced from short-cut fibers, spunbond, meltblown fabrics, tea bag paper, face cloths, shingling and synthetic fiber paper, composite, carded/carding, needle punch, thermal bonded, chemical bonded, nanotechnology, and activated carbon filter material.

14. The method according to claim 1, which further comprises:
weaving the mask pattern to create a pocket at a top center of the mask pattern; and
providing a moldable frame piece into the pocket to permit customization of a shape of a nose portion of the mask.

15. The method according to claim 1, which further comprises carrying out the cutting step by cutting the mask patterns with at least one of a hot knife slitter, a cold knife cutter, a laser cutter, and an air-jet cutter.

16. The method according to claim 1, which further comprises weaving the mask pattern to create a cutter guide weave at the four extreme edges of each mask pattern.

17. The method according to claim 1, which further comprises, before the step of cutting, rolling the sheet onto a dowel and, after removing the dowel from the loom, carrying out the step of cutting with a laser cutter.

18. A method for producing a woven personal respirator mask, which comprises:
providing a plurality of warp ends into an electronic woven label loom;
programming the loom to weave the warp ends into a sheet having a repeating mask pattern in a weft direction, the mask pattern comprising an edge border having a tight weave and defining therein a filter section, the filter section having a tubular weave to define an outer layer and an inner layer, at least one of the outer layer and an inner layers comprising a filter weave, and at least one intermediate interlock fastening at least a point of the outer layer to an opposing point on the inner layer; and
cutting the sheet to separate the repeating mask pattern into individual mask parts with a hot-wire slitter.

19. The method according to claim 1, which further comprises cutting cord holes at least at corners of the individual mask part.

20. The method according to claim 19, which further comprises securing an elastic ear cord through side pair of cord holes to create a pair of ear-securing loops for each mask part and form a woven personal respirator mask.

* * * * *